(12) United States Patent
Kim et al.

(10) Patent No.: US 12,541,302 B2
(45) Date of Patent: Feb. 3, 2026

(54) METHOD OF PERFORMING COPYBACK OPERATION IN NONVOLATILE MEMORY DEVICE, AND NONVOLATILE MEMORY DEVICE AND STORAGE DEVICE PERFORMING THE SAME

(71) Applicant: SAMSUNG ELECTRONICS CO., LTD., Suwon-si (KR)

(72) Inventors: Myungkyu Kim, Suwon-si (KR); Beomkyu Shin, Suwon-si (KR); Jungho Park, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 18/830,460

(22) Filed: Sep. 10, 2024

(65) Prior Publication Data

US 2025/0231687 A1    Jul. 17, 2025

(30) Foreign Application Priority Data

Jan. 12, 2024   (KR) .................. KR10-2024-0005374

(51) Int. Cl.
*G06F 3/06* (2006.01)

(52) U.S. Cl.
CPC .......... *G06F 3/0613* (2013.01); *G06F 3/0659* (2013.01); *G06F 3/0673* (2013.01)

(58) Field of Classification Search
CPC ..... G06F 3/0613; G06F 3/0659; G06F 3/0673
See application file for complete search history.

(56) References Cited

U.S. PATENT DOCUMENTS

| 8,185,706 | B2 | 5/2012 | Wakrat et al. |
| 8,443,263 | B2 | 5/2013 | Selinger et al. |
| 8,458,566 | B2 | 6/2013 | Peng et al. |
| 8,572,335 | B2 | 10/2013 | Wakrat et al. |
| 8,760,921 | B2 | 6/2014 | Kawase et al. |
| 9,158,621 | B2* | 10/2015 | Sharon ............... G11C 29/52 |
| 10,489,246 | B2 | 11/2019 | Ou et al. |
| 10,535,406 | B2 | 1/2020 | Hwang et al. |

FOREIGN PATENT DOCUMENTS

KR    1471262    12/2014

* cited by examiner

*Primary Examiner* — Eric Cardwell
(74) *Attorney, Agent, or Firm* — Fish & Richardson P.C.

(57) ABSTRACT

In performing a copyback operation, a copyback command for target data that are programmed in a source area based on first voltage levels is received. A hard data read operation and a soft data read operation are performed on the target data based on the copyback command. Memory cells in the source area are classified into normal memory cells and weak memory cells, based on results of the hard data read operation and the soft data read operation. A first copyback program operation in which first data among the target data are stored in a destination area is performed, based on second voltage levels. The first data correspond to the normal memory cells. A second copyback program operation in which second data among the target data are stored in the destination area is performed, based on third voltage levels. The second data correspond to the weak memory cells.

20 Claims, 33 Drawing Sheets

METHOD OF PERFORMING COPYBACK OPERATION IN NONVOLATILE MEMORY DEVICE, AND NONVOLATILE MEMORY DEVICE AND STORAGE DEVICE PERFORMING THE SAME

CROSS-REFERENCE TO RELATED APPLICATION

This application claims priority under 35 USC § 119 to Korean Patent Application No. 10-2024-0005374 filed on Jan. 12, 2024 in the Korean Intellectual Property Office (KIPO), the content of which is herein incorporated by reference in its entirety.

BACKGROUND

Semiconductor memory devices may be divided into two categories depending upon whether or not they retain stored data when disconnected from a power supply. These categories include volatile memory devices, which lose stored data when disconnected from power, and nonvolatile memory devices, which retain stored data when disconnected from power. While volatile memory devices may perform read and write operations at a high speed, contents stored therein may be lost at power-off. Since nonvolatile memory devices retain contents stored therein even at power-off, they may be used to store data that needs to be retained.

Regarding the nonvolatile memory device, a copyback operation may be performed to copy data of any one source area back to a destination area. When an error is detected from data of the source area during the copyback operation, the detected error may be corrected and the error-corrected data may be written in the destination area. However, the copyback operation accompanying the error correction operation may increase the time required to perform the copyback operation, thus reducing the access performance.

SUMMARY

According to an aspect, the present disclosure provides a method of performing a copyback operation in a nonvolatile memory device capable of efficiently reducing performance degradation while the copyback operation is performed.

According to an aspect, the present disclosure provides a nonvolatile memory device and a storage device performing the method of performing the copyback operation.

According to some implementations, in a method of performing a copyback operation in a nonvolatile memory device, a copyback command for target data that are programmed in a source area based on first voltage levels is received. A hard data read operation is performed on the target data based on the copyback command. A soft data read operation is performed on the target data based on the copyback command. The soft data read operation is different from the hard data read operation. Memory cells in the source area are classified into normal memory cells and weak memory cells, based on results of the hard data read operation and the soft data read operation. A first copyback program operation in which first data among the target data are stored in a destination area is performed, based on second voltage levels. The first data correspond to the normal memory cells. A second copyback program operation in which second data among the target data are stored in the destination area is performed, based on third voltage levels different from second voltage levels. The second data correspond to the weak memory cells.

According to some implementations, a nonvolatile memory device includes a memory cell array, a page buffer circuit and a control circuit. The memory cell array includes a plurality of memory cells, a source area in which target data are programmed based on first voltage levels, and a destination area in which the target data are to be copied. The page buffer circuit temporarily stores the target data. The control circuit controls an operation of the memory cell array, receives a copyback command for the target data, performs a hard data read operation on the target data based on the copyback command, performs a soft data read operation on the target data based on the copyback command, classifies memory cells in the source area into normal memory cells and weak memory cells, based on results of the hard data read operation and the soft data read operation, performs a first copyback program operation in which first data among the target data are stored in a destination area, based on second voltage levels, and performs a second copyback program operation in which second data among the target data are stored in the destination area, based on third voltage levels different from second voltage levels. The soft data read operation is different from the hard data read operation. The first data correspond to the normal memory cells. The second data correspond to the weak memory cells.

According to some implementations, a storage device includes a plurality of nonvolatile memory devices and a storage controller that controls operations of the plurality of nonvolatile memory devices. Each of the plurality of nonvolatile memory devices includes a memory cell array, a page buffer circuit and a control circuit. The memory cell array includes a plurality of memory cells, a source area in which target data are programmed based on first voltage levels, and a destination area in which the target data are to be copied. The page buffer circuit temporarily stores the target data. The control circuit controls an operation of the memory cell array, receives a copyback command for the target data, performs a hard data read operation on the target data based on the copyback command, performs a soft data read operation on the target data based on the copyback command, classifies memory cells in the source area into normal memory cells and weak memory cells, based on results of the hard data read operation and the soft data read operation, performs a first copyback program operation in which first data among the target data are stored in a destination area, based on second voltage levels, and performs a second copyback program operation in which second data among the target data are stored in the destination area, based on third voltage levels different from second voltage levels. The soft data read operation is different from the hard data read operation. The first data correspond to the normal memory cells. The second data correspond to the weak memory cells.

In the method of performing the copyback operation in the nonvolatile memory device, the nonvolatile memory device and the storage device according to some implementations, the internal copyback operation may be performed using the distribution copy operation that copies the threshold voltage distribution, without the ECC operation. For example, two different read operations may be performed, the first data corresponding to the normal memory cells and the second data corresponding to the weak memory cells may be classified based on the two different read operations, and the first data and the second data may be internally and separately stored. In addition, two different program operations may be performed on the data of the normal memory cells and the data of the weak memory cells that are separately stored, and the copy data having the threshold voltage distribution substantially the same as that of the target data may be efficiently stored in the destination area. Accordingly, the occurrence of additional hard errors may be prevented without using the I/O bus or without the ECC operation, the efficient copyback operation may be performed, and the performance of the nonvolatile memory device may be improved or enhanced.

BRIEF DESCRIPTION OF THE DRAWINGS

Illustrative, non-limiting implementations will be more clearly understood from the following detailed description taken in conjunction with the accompanying drawings.

DETAILED DESCRIPTION

Figure 1:
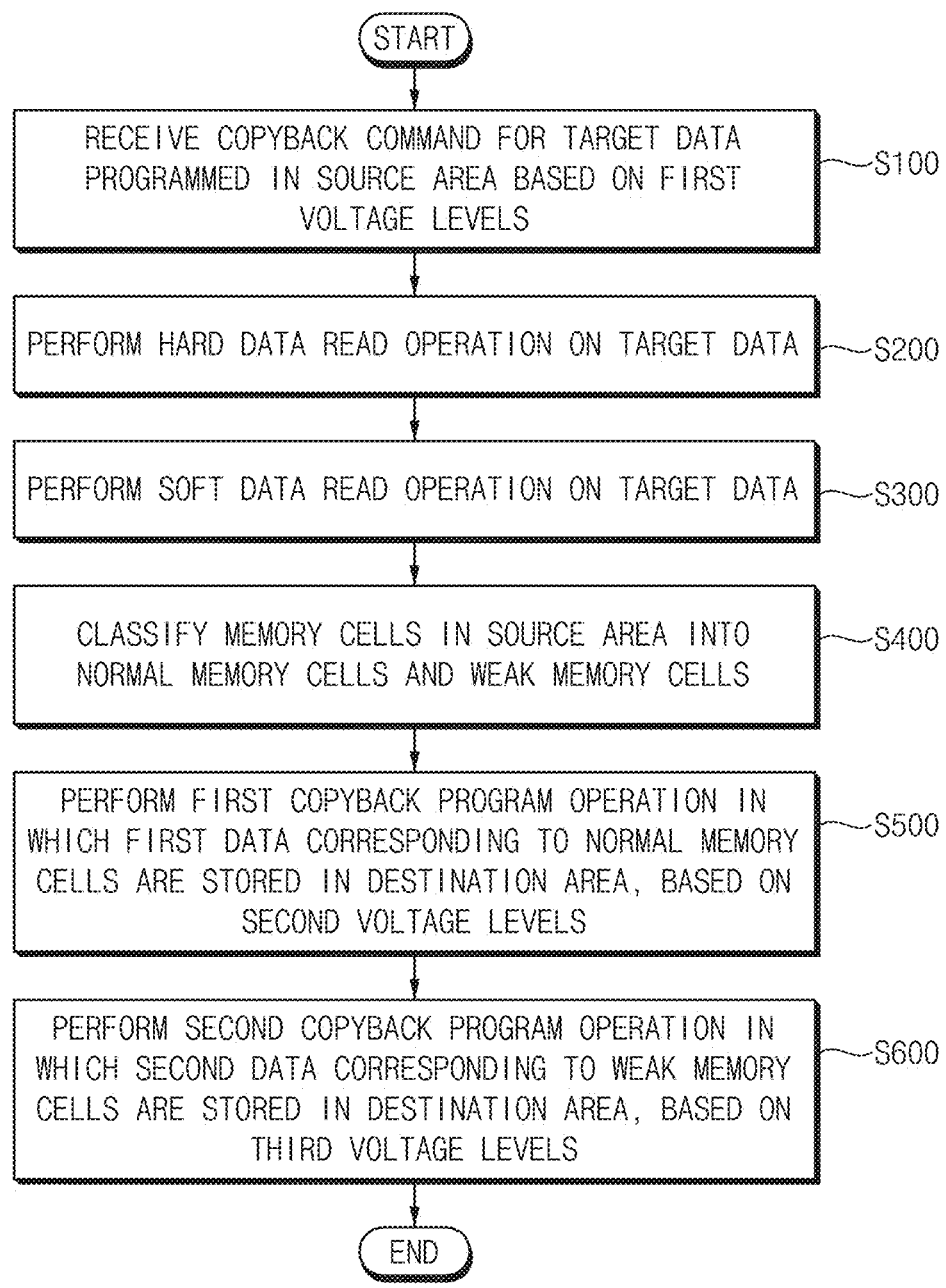
FIG. 1 is a flowchart illustrating a method of performing a copyback operation in a nonvolatile memory device according to some implementations.

Various implementations will be described more fully with reference to the accompanying drawings, in which some implementations are shown. The present disclosure may, however, be embodied in many different forms and should not be construed as limited to the implementations set forth herein. Like reference numerals refer to like elements throughout this application.

FIG. 1 is a flowchart illustrating a method of performing a copyback operation in a nonvolatile memory device according to some implementations.

Referring to FIG. 1, a method of performing a copyback operation according to some implementations is performed by a nonvolatile memory device that includes a memory cell array and a page buffer circuit. The memory cell array includes a plurality of memory cells, and the page buffer circuit stores data to be read from the memory cell array or programmed into the memory cell array. A configuration of the nonvolatile memory device will be described in detail with reference to FIGS. 2 and 20.

In the method of performing the copyback operation in the nonvolatile memory device according to some implementations, a copyback command for target data, which are a target of the copyback operation, is received (operation S100). For example, the target data may be data that has already been programmed in a source area based on first voltage levels. For example, an operation of programming the target data into the source area may be referred to as an initial program operation. The method of performing the copyback operation in the nonvolatile memory device according to some implementations may be performed after the initial program operation.

When the nonvolatile memory device is operating, various memory management operations such as a garbage collection (GC) operation or a data merge operation may be performed. While such memory management operations are performing, a request for the copyback operation in which the target data stored in the source area is copied to a destination area may be generated. The nonvolatile memory device may receive the copyback command for the copyback operation from a memory controller that is located outside the nonvolatile memory device.

Based on the copyback command, a hard data read operation is performed on the target data (operation S200). For example, the hard data read operation may be or may represent an operation in which each bit of the target data into possible values (e.g., 0 or 1) is determined, decided or identified using one reference value. For example, the hard data read operation may be referred to as a hard decision operation.

Based on the copyback command, a soft data read operation, which is different from the hard data read operation, is performed on the target data (operation S300). For example, unlike the hard data read operation, the soft data read operation may be or may represent an operation in which each bit of the target data is determined, decided or identified using two or more reference values. For example, the soft data read operation may be referred to as a soft decision operation.

Based on results of the hard data read operation and the result of the soft data read operation, memory cells included in the source area in which the target data are stored are classified or divided into normal memory cells (or strong memory cells) and weak memory cells (operation S400). For example, the normal memory cells may be or may include memory cells in which data stored by the initial program operation have not been changed, e.g., in which no error has occurred. For example, the weak memory cells may be or may include memory cells in which data stored by the initial program operation have been changed, e.g., at least one error has occurred. For example, the error occurring in the weak memory cells may be a correctable error or a soft error.

In some implementations, the memory cells in the source area, the normal memory cells and the weak memory cells, which are the terms associated with or related to the source area, may be referred to as source memory cells, normal source memory cells and weak source memory cells, respectively.

The hard data read operation in S200, the soft data read operation in S300, and the classification operation in S400 will be described in detail with reference to FIGS. 5, 6A, 6B, 7A, 7B, 8A and 8B.

A first copyback program operation in which first data among the target data are stored in the destination area is performed (operation S500). The first data correspond to the normal memory cells. For example, the first copyback program operation may be performed based on second voltage levels. For example, the first data may be programmed into first memory cells among memory cells in the destination area. In some implementations, the second voltage levels may be the substantially same as or different from the first voltage levels used in the initial program operation.

A second copyback program operation in which second data among the target data are stored in the destination area is performed (operation S600). The second data correspond to the weak memory cells. For example, the second copyback program operation may be performed based on third voltage levels that are different from the second voltage levels. For example, the second data may be programmed into second memory cells among the memory cells in the destination area.

In some implementations, the memory cells in the destination area, the first memory cells and the second memory cells, which are the terms associated with or related to the destination area, may be referred to as destination memory cells, normal destination memory cells, and weak destination memory cells, respectively. The first data and the second data may be referred to as normal data and weak data, respectively. Data stored in the destination area corresponding to the target data may be referred to as copy data.

The first copyback program operation in S500 and the second copyback program operation in S600 will be described in detail with reference to FIGS. 9, 10, 11, 12A and 12B.

FIGS. 2, 3A, 3B, 3C, 3D, 4A, 4B and 4C are diagrams for describing a method of performing a copyback operation in a nonvolatile memory device according to some implementations.

Figure 2:
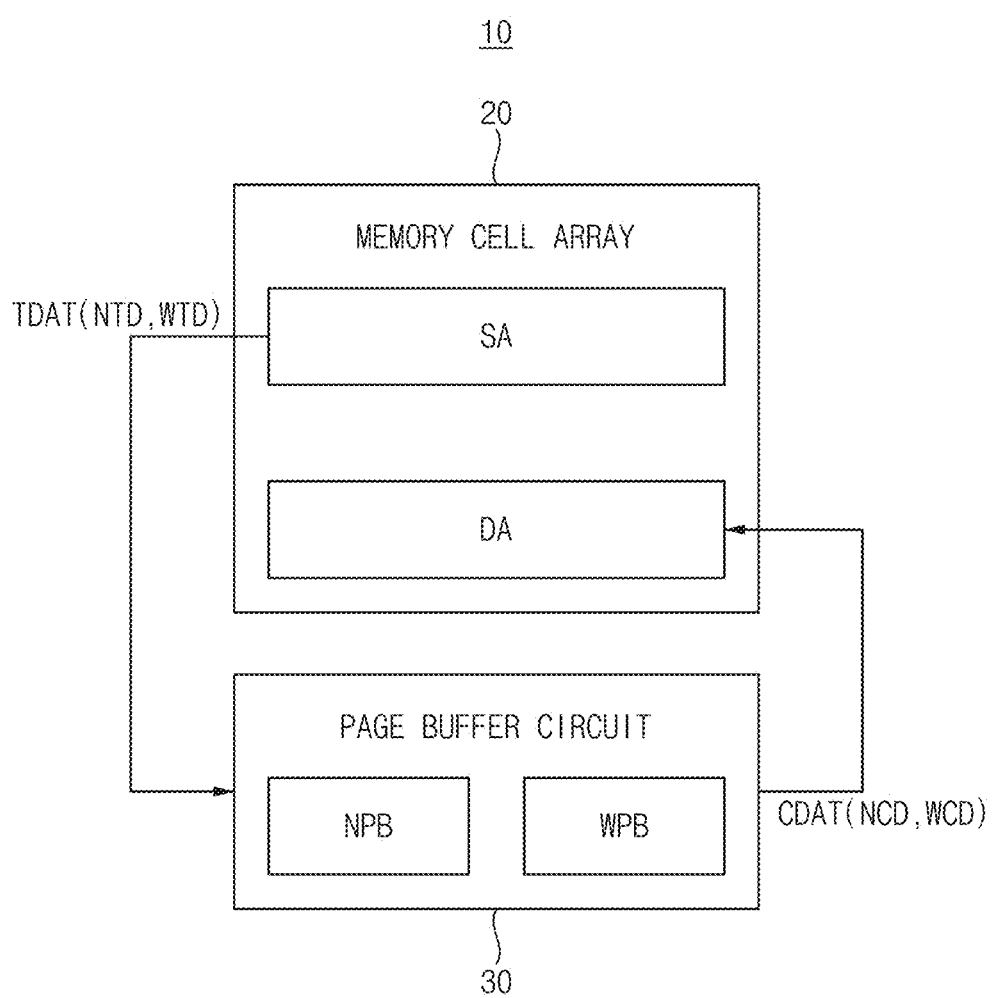
FIGS. 2, 3A, 3B, 3C, 3D, 4A, 4B and 4C are diagrams for describing a method of performing a copyback operation in a nonvolatile memory device according to some implementations.

Referring to FIG. 2, a nonvolatile memory device 10 that performs the method of performing the copyback operation according to some implementations is illustrated.

The nonvolatile memory device 10 includes a memory cell array 20 and a page buffer circuit 30.

The memory cell array 20 includes a plurality of memory cells, and includes a source area SA in which target data TDAT is programmed and a destination area DA to which the target data TDAT is to be copied. For example, as described with reference to FIG. 1, the target data TDAT includes first data NTD stored in normal memory cells and second data WTD stored in weak memory cells.

The page buffer circuit 30 temporarily stores the target data TDAT. For example, as will be described with reference to FIGS. 23A and 23B, the page buffer circuit 30 may include a plurality of page buffers, and the plurality of page buffers may include a plurality of latches.

The nonvolatile memory device 10 may perform the method of performing the copyback operation in the nonvolatile memory device according to some implementations described with reference to FIG. 1. For example, as will be described with reference to FIG. 20, the nonvolatile memory device 10 may further include a control circuit that performs the operations in FIG. 1.

In some implementations, the copyback operation performed by the method according to implementations may be an internal copyback operation in which the target data TDAT is not output to the outside of the nonvolatile memory device 10 and an error correction code (ECC) operation is not performed on the target data TDAT.

For example, when the hard data read operation and the soft data read operation are performing, the target data TDAT may be internally stored in the nonvolatile memory device 10 without being output to an external device or the outside of the nonvolatile memory device 10. For example, the target data TDAT may be read or retrieved from the source area SA, and may be stored in the page buffer circuit 30 included in the nonvolatile memory device 10. For example, among the target data TDAT, the first data NTD and the second data WTD may be stored in different areas of the page buffer circuit 30. For example, the first data NTD corresponding to the normal memory cells may be stored in a first area of the page buffer circuit 30 or in first page buffers NPB included in the first area, and the second data WTD corresponding to the weak memory cells may be stored in a second area of the page buffer circuit 30 different from the first area or in second page buffers WPB included in the second area.

In addition, when the first copyback program operation and the second copyback program operation are performing, the first data NTD and the second data WTD may be internally provided to the nonvolatile memory device 10 without being received from the external device or the outside the nonvolatile memory device 10. For example, copy data CDAT which include data NCD corresponding to the first data NTD and data WCD corresponding to the second data WTD, may be output from the page buffer circuit 30 included in the nonvolatile memory device 10, and may be stored in the destination area DA.

Referring to FIGS. 3A, 3B, 3C and 3D, examples of a threshold voltage distribution of data stored in a nonvolatile memory device are illustrated.

Figure 3A:
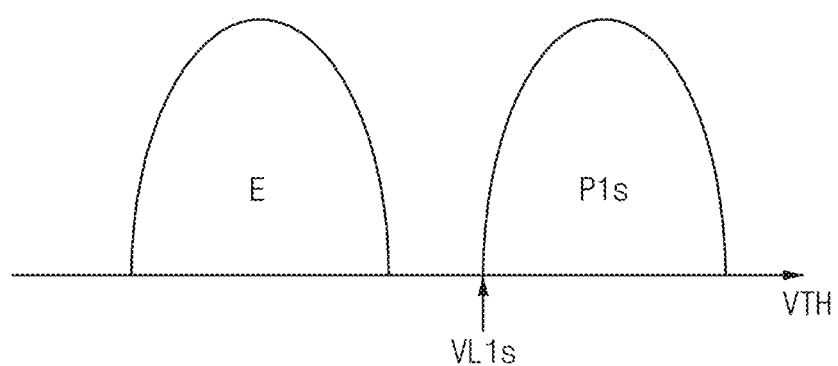

For example, FIG. 3A illustrates an example where each of the plurality of memory cells included in the memory cell array 20 stores one data bit, e.g., an example where each memory cell is a single-level memory cell (SLC) storing 1-bit data. Each of SLCs may have one of an erase state E and a program state P1$s$, and a threshold voltage distribution of the SLCs may include the states E and P1s. A voltage level VL1$s$ may be used to distinguish or determine the states E and P1s.

Figure 3B:
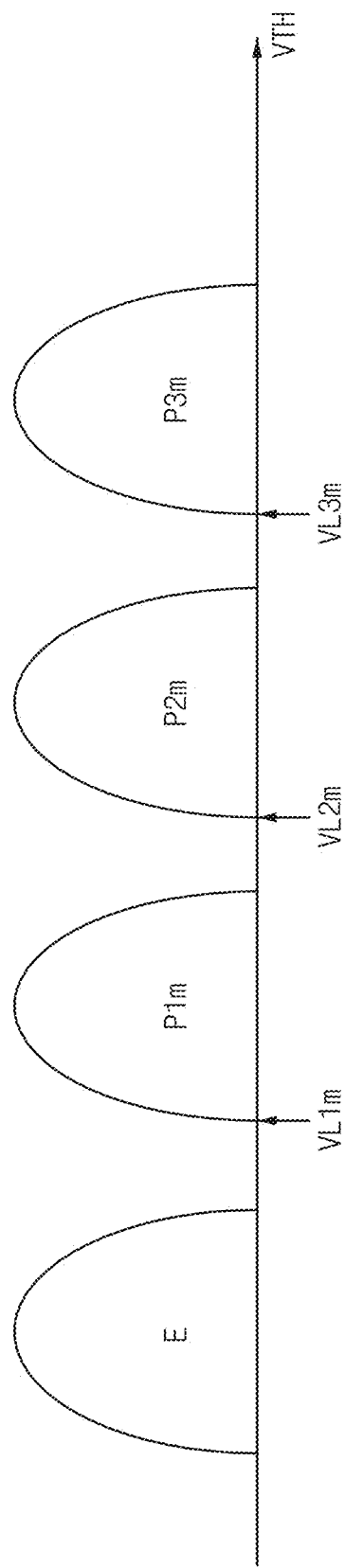

For example, FIG. 3B illustrates an example where each of the plurality of memory cells stores two data bits, e.g., an example where each memory cell is a multi-level memory cell (MLC) storing 2-bit data. Each of MLCs may have one of an erase state E and a plurality of program states P1$m$, P2$m$ and P3$m$, and a threshold voltage distribution of the MLCs may include the states E and P1m to P3m. Voltage levels VL1m, VL2m and VL3m may be used to distinguish or determine the states E and P1m to P3m. For example, it may be distinguished using the voltage level VL1m whether each MLC has the erase state E or the program state P1m.

Figure 3C:
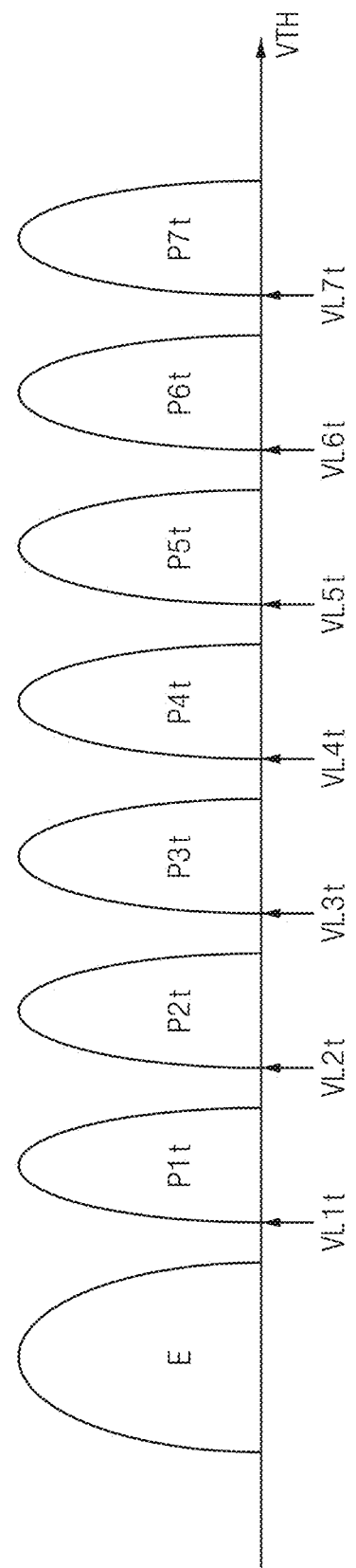

For example, FIG. 3C illustrates an example where each of the plurality of memory cells stores three data bits, e.g., an example where each memory cell is a triple-level memory cell (TLC) storing 3-bit data. Each of TLCs may have one of an erase state E and a plurality of program states P1t, P2t, P3t, P4t, P5t, P6t and P7t, and a threshold voltage distribution of the TLCs may include the states E and P1t to P7t. Voltage levels VL1t, VL2t, VL3t, VL4t, VL5t, VL6t and VL7t may be used to distinguish or determine the states E and P1t to P7t.

Figure 3D:
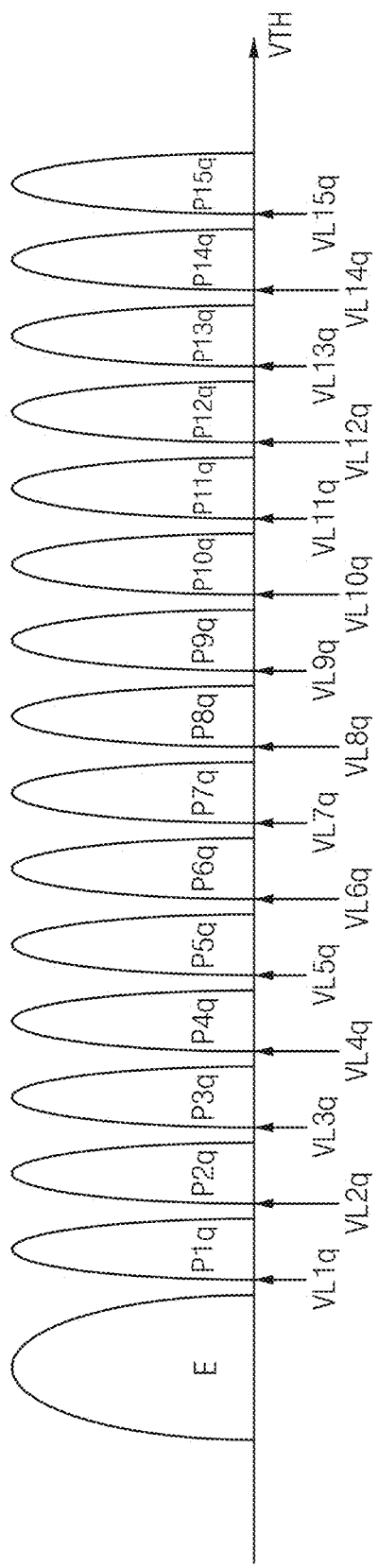

For example, FIG. 3D illustrates an example where each of the plurality of memory cells stores four data bits, e.g., an example where each memory cell is a quadruple-level memory cell (QLC) storing 4-bit data. Each of QLCs may have one of an erase state E and a plurality of program states P1q, P2q, P3q, P4q, P5q, P6q, P7q, P8q, P9q, P10q, P11q, P12q, P13q, P14q and P15q, and a threshold voltage distribution of the QLCs may include the states E and P1q to P15q. Voltage levels VL1q, VL2q, VL3q, VL4q, VL5q, VL6q, VL7q, VL8q, VL9q, VL10q, VL11q, VL12q, VL13q, VL14q and VL15q may be used to distinguish or determine the states E and P1q to P15q.

In some implementations, when the memory cells have two or more program states (e.g., when each memory cell stores two or more data bits) as illustrated in FIGS. 3B, 3C and 3D, the memory cells may be programmed based on a one-shot scheme in which the program states are formed at once. In some implementations, when the memory cells have two or more program states as illustrated in FIGS. 3B, 3C and 3D, the memory cells may be programmed based on a multi-step scheme in which the program states are formed by a plurality of steps.

Although some implementations are described based on the SLCs, the MLCs, the TLCs and the QLCs, some implementations are not limited thereto, and each memory cell may be an arbitrary multi-bit cell that stores k-bit data and is programmed such that each memory cell has one of $2^k$ states, where k is a positive integer greater than or equal to two.

Figure 4A:
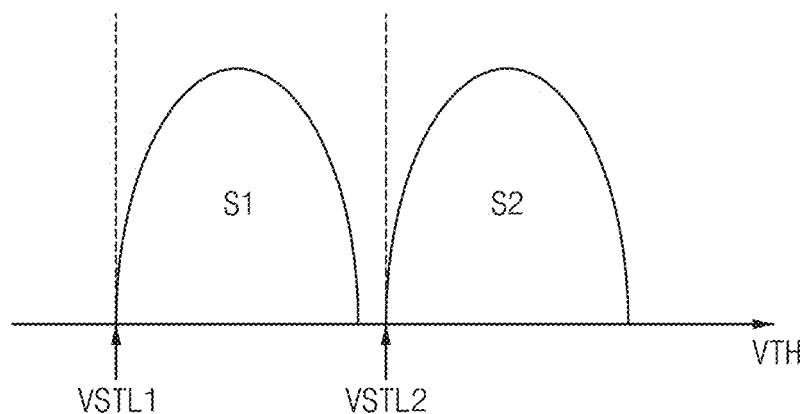
Figure 4B:
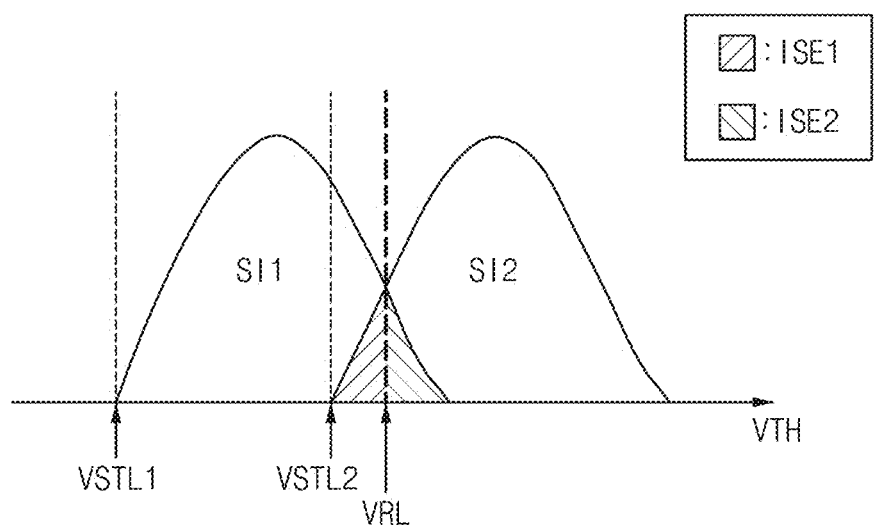

Referring to FIGS. 4A and 4B, an example of a threshold voltage distribution of the target data TDAT stored in the source area SA of the memory cell array 20 is illustrated. FIG. 4A illustrates a threshold voltage distribution immediately after the initial program operation is performed, and FIG. 4B illustrates that the threshold voltage distribution of FIG. 4A is degraded over time.

In some implementations, each of the plurality of memory cells included in the memory cell array 20 may store two or more data bits and may be programmed such that each of the plurality of memory cells has a respective one of a plurality of program states. In this case, first and second initial states S1 and S2 in FIG. 4A and first and second states SI1 and SI2 in FIG. 4B may be two adjacent program states among the plurality of program states. For example, the first and second initial states S1 and S2 and the first and second states SI1 and SI2 may correspond to adjacent two of the program states P1m to P3m in FIG. 3B, may be adjacent two of the program states P it to P7t in FIG. 3C, or may be adjacent two of the program states P1q to P15q in FIG. 3D. However, some implementations are not limited thereto.

For example, as illustrated in FIG. 4A, after the initial program operation in which the target data TDAT are stored in the source area SA based on the first voltage levels is performed, the memory cells in the source area SA in which the target data TDAT are stored may be programmed such that each memory cell has one of the first initial state S1 and the second initial state S2 that are different from each other.

For example, the first voltage levels may include a first initial target level VSTL1 and a second initial target level VSTL2. The first initial state S1 may be formed by the first initial target level VSTL1, and the second initial state S2 may be formed by the second initial target level VSTL2. For example, threshold voltages of memory cells having the first initial state S1 may be formed to be higher than or equal to the first initial target level VSTL1 and lower than the second initial target level VSTL2, and threshold voltages of memory cells having the second initial state S2 may be formed to be higher than or equal to the second initial target level VSTL2.

For example, the first initial state S1 may correspond to a first data value (e.g., '1') and the second initial state S2 may correspond to a second data value (e.g., '0'). However, some implementations are not limited thereto.

As illustrated in FIG. 4A, the first initial state S1 and the second initial state S2 may not overlap each other, and thus it may be relatively easy to determine whether each memory cell has the first initial state S1 or the second initial state S2. For example, when a threshold voltage of each memory cell is lower than the second initial target level VSTL2, it may be determined that each memory cell has the first initial state S1. For example, when the threshold voltage of each memory cell is higher than or equal to the second initial target level VSTL2, it may be determined that each memory cell has the second initial state S2.

In contrast, as illustrated in FIG. 4B, as the threshold voltage distribution is degraded or deteriorated, the first initial state S1 and the second initial state S2 may be change into the first state SI1 and the second state SI2, respectively.

As compared with the first initial state S1 and the second initial state S2, the first state SI1 and the second state SI2 may have a laterally spread shape, and thus the first state SI1 and the second initial state SI2 may partially overlap each other. For example, although the first state SI1 is similar to the first initial state S1 in that they are higher than the first initial target level VSTL1, and although the second state SI2 is similar to the second initial state S2 in that they are higher than the second initial target level VSTL2, at least a portion of the first states SI1 may become higher than the second initial target level VSTL2 due to such degradation or deterioration.

When the threshold voltage distribution is degraded as illustrated in FIG. 4B, initial error areas ISE1 and ISE2 may occur as compared with immediately after the initial program operation is performed described with reference to FIG. 4A, even if a read operation is performed using an optimal read level VRL corresponding to a valley between the first state SI1 and the second state SI2. For example, the first initial error area ISE1 may correspond to memory cells that are programmed to the second initial state S2 (e.g., '0') by the initial program operation and are determined to be in the first state SI1 (e.g., '1') based on the read level VRL as the threshold voltage distribution is degraded. For example, the second initial error area ISE2 may correspond to memory cells that are programmed to the first initial state S1 (e.g., '1') by the initial program operation and are determined to be in the second state SI2 (e.g., '0') based on the read level VRL as the threshold voltage distribution is degraded.

For example, the initial error areas ISE1 and ISE2 may correspond to the weak memory cells described with reference to FIG. 1, and the remaining areas of the first and second states SI1 and SI2 other than the initial error areas ISE1 and ISE2 may correspond to the normal memory cells described with reference to FIG. 1. For example, the weak memory cells corresponding to the initial error areas ISE1 and ISE2 may have errors (e.g., soft errors) that are correctable by the ECC operation.

In the method of performing the copyback operation in the nonvolatile memory device according to some implementations, the internal copyback operation described with reference to FIG. 2 may include the distribution copy operation in which the threshold voltage distribution is copied as it is. For example, before the first copyback program operation and the second copyback program operation are performed, the normal memory cells and the weak memory cells may have a first threshold voltage distribution. For example, after the first copyback program operation and the second copyback program operation are performed, the first memory cells in which the first data (e.g., NTD or NCD in FIG. 2) are stored in the destination area DA and the second memory cells in which the second data (e.g., WTD or WCD in FIG. 2) are stored in the destination area DA may have a second threshold voltage distribution. For example, the first threshold voltage distribution and the second threshold voltage distribution may be substantially the same as, equal to and/or identical to each other. For example, the threshold voltage distribution of the weak memory cells in the source area SA before the internal copyback operation may be substantially the same as the threshold voltage distribution of the second memory cells (e.g., the weak destination memory cells) in the destination area DA after the internal copyback operation. For example, the threshold voltage distribution of the normal memory cells in the source area SA before the internal copyback operation may be substantially the same as the threshold voltage distribution of the first memory cells (e.g., the normal destination memory cells) in the destination area DA after the internal copyback operation. The change in the threshold voltage distribution will be described with reference to FIGS. 11, 12A and 12B.

Figure 4C:
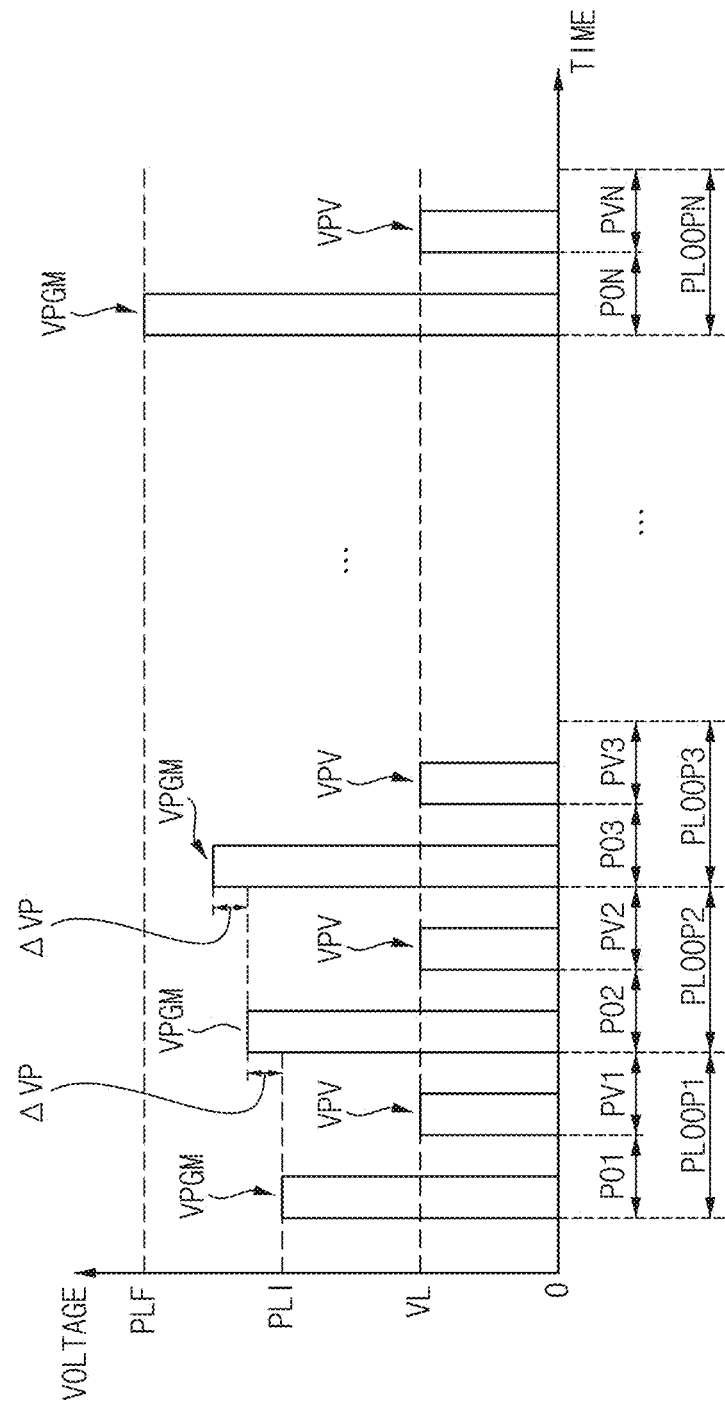

Referring to FIG. 4C, the program operation may be performed based on an incremental step pulse program (ISPP) scheme.

For example, a plurality of program loops PLOOP1, PLOOP2, PLOOP3, . . . , PLOOPPN may be sequentially performed, where N is a positive integer greater than or equal to two. For each program loop, a respective one of program execution operations PO1, PO2, PO3, . . . , PON using a program voltage VPGM and a respective one of program verification operations PV1, PV2, PV3, . . . , PVN using a program verification voltage VPV may be sequentially performed. When a program execution operation and a program verification operation in a specific program loop (e.g., in the program loop PLOOP3) are successfully completed, subsequent program loops (e.g., the program loop PLOOPN) may not be performed, and the process may be terminated.

In some implementations, a voltage level of the program voltage VPGM in a current program loop may be higher than that of the program voltage VPGM in a previous program loop, and the program verification voltage VPV may have a constant voltage level VL. For example, in the first program loop PLOOP1, the program voltage VPGM may have an initial voltage level PLI. In the second program loop PLOOP2, the program voltage VPGM may have a voltage level that increases by a step level ΔVP from the initial voltage level PLI. In the third program loop PLOOP3, the program voltage VPGM may have a voltage level that increases by the step level ΔVP from the voltage level of the program voltage VPGM in the second program loop PLOOP2. In the N-th program loop PLOOPN which is the last program loop, the program voltage VPGM may have a final voltage level PLF.

In some implementations, the initial program operation described with reference to FIG. 4A may be performed based on the ISPP scheme. For example, at least one of the first initial target level VSTL1 and the second initial target level VSTL2 in FIG. 4A may be the voltage level of the program voltage VPGM of the program loop that is finally performed (e.g., successfully completed) in the ISPP scheme.

Although FIG. 4C illustrates that the program verification voltage VPV maintains the constant voltage level VL, some implementations are not limited thereto, and the voltage level of the program verification voltage VPV may be changed as the program loops are repeatedly performed. In addition, although FIG. 4C illustrates that the voltage level of the program voltage VPGM increases by a fixed level (e.g., the step level ΔVP) as the program loops are repeatedly performed, some implementations are not limited thereto, and the amount of change in the program voltage VPGM may be changed for each program loop.

In some implementations, the program operation may be performed based on a multi-pulse program scheme in which the program voltage VPGM is applied multiple times while changing the voltage level of the program voltage VPGM during one program loop. In some implementations, the program operation may be performed based on a scheme in which the program verification voltage VPV is applied multiple times while changing the voltage level of the program verification voltage VPV during one program loop.

Figure 5:
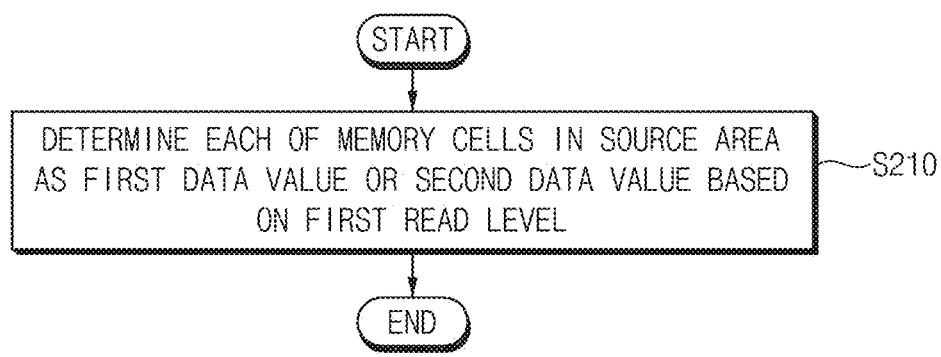
FIG. 5 is a flowchart illustrating an example of performing a hard data read operation in FIG. 1.
Figure 6A:
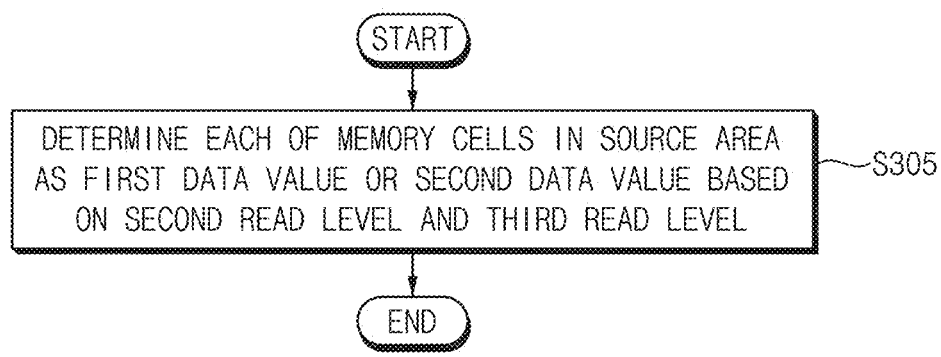
FIGS. 6A and 6B are flowcharts illustrating examples of performing a soft data read operation in FIG. 1.
Figure 6B:
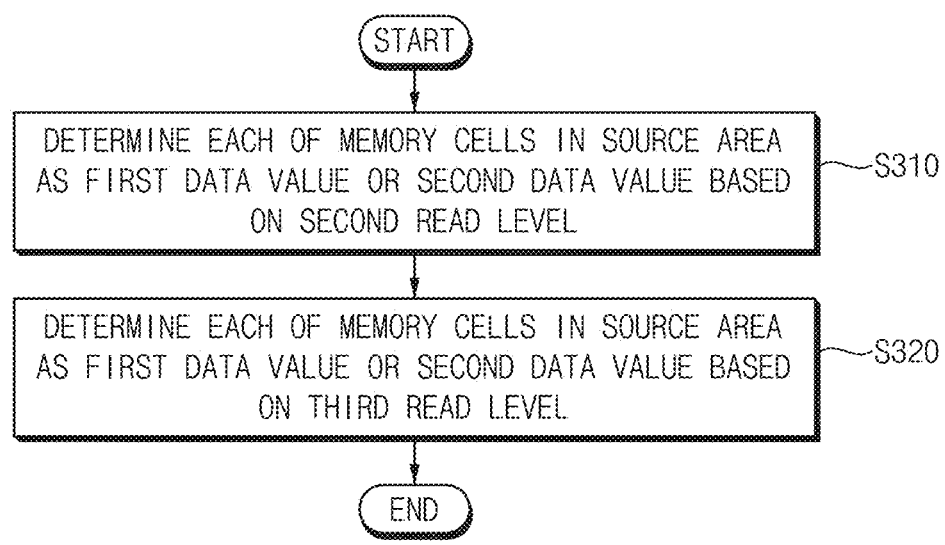
Figure 7A:
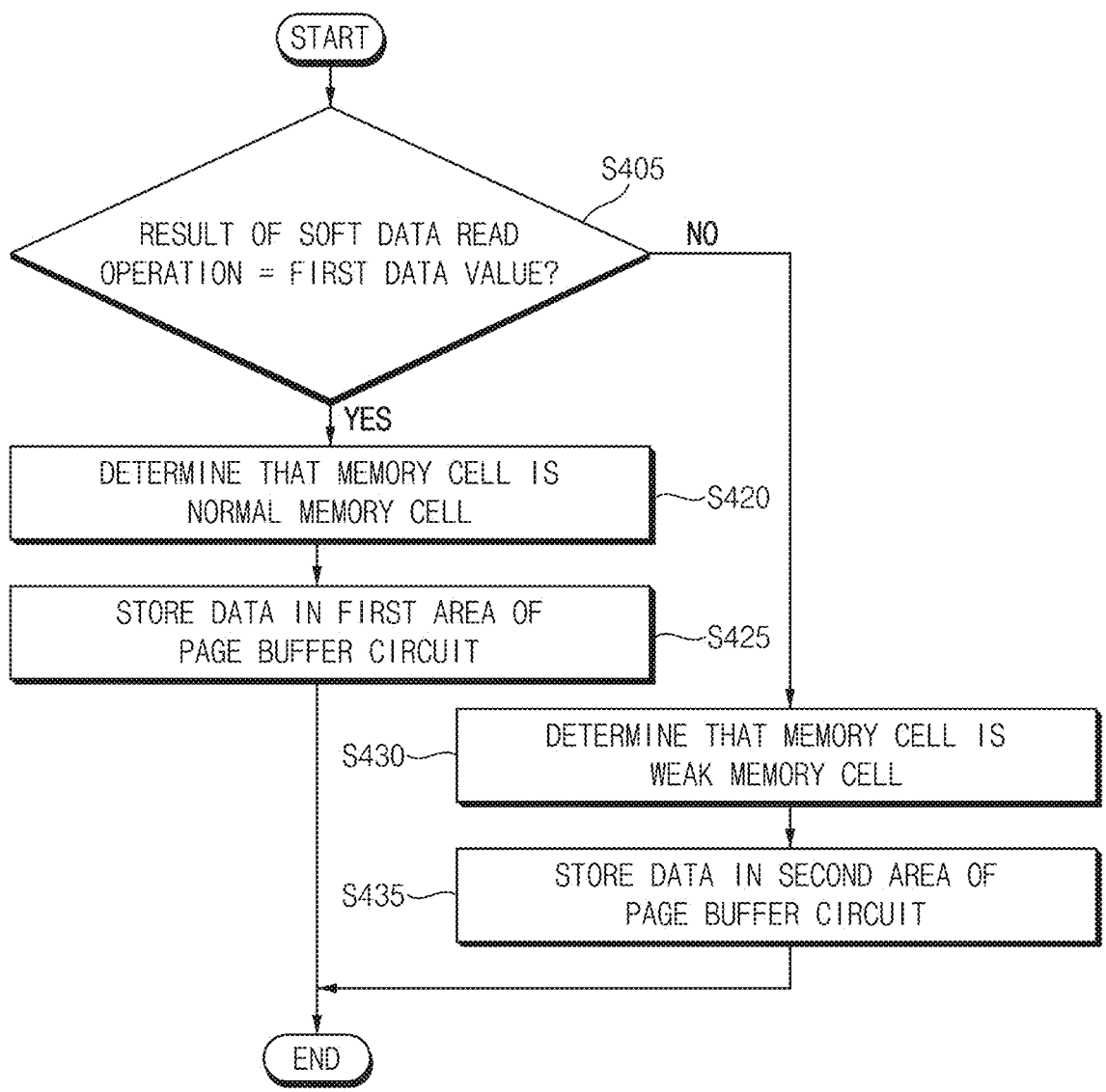
FIGS. 7A and 7B are flowcharts illustrating examples of classifying memory cells in a source area into normal memory cells and weak memory cells in FIG. 1.
Figure 7B:
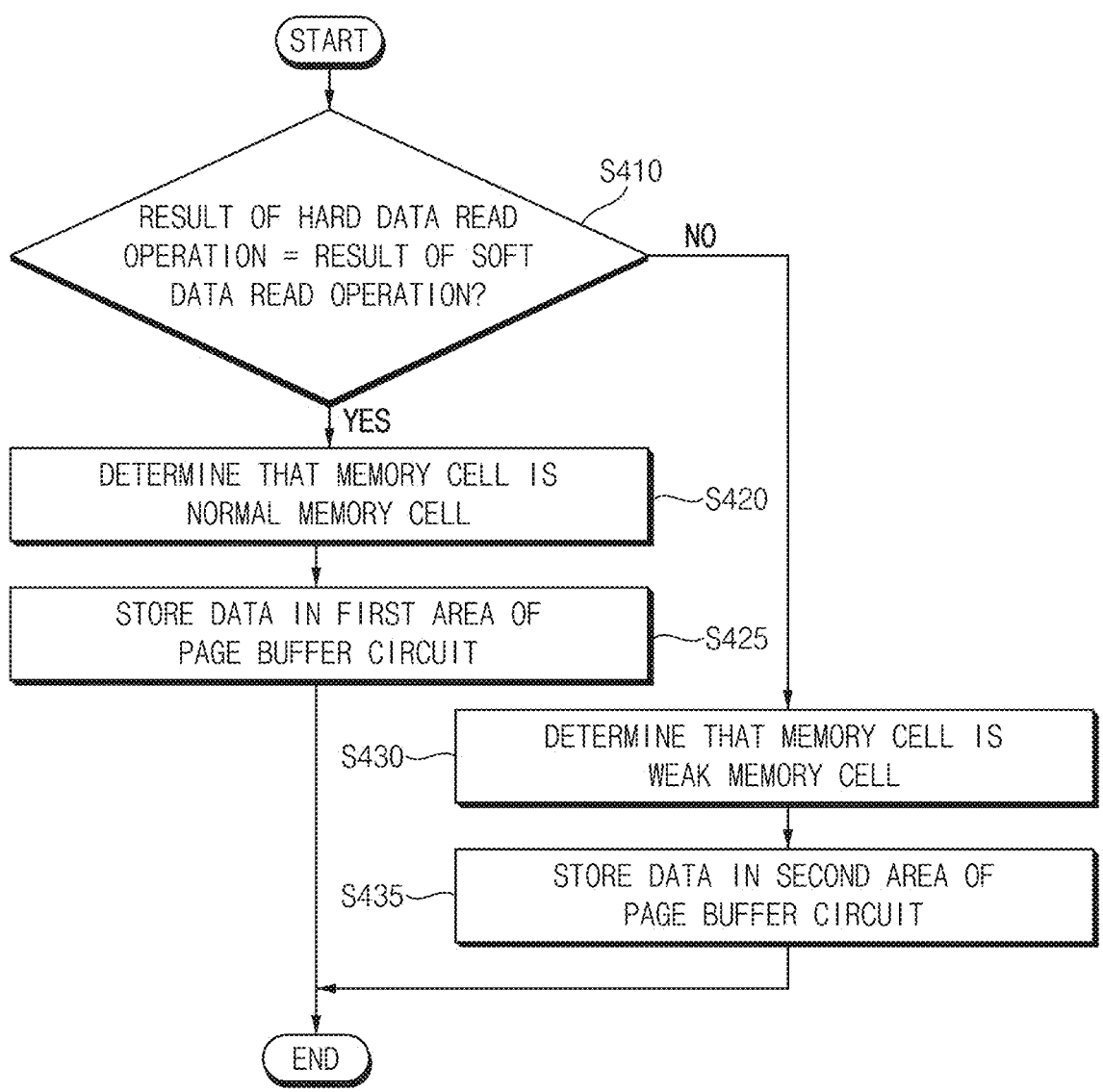
Figure 8A:
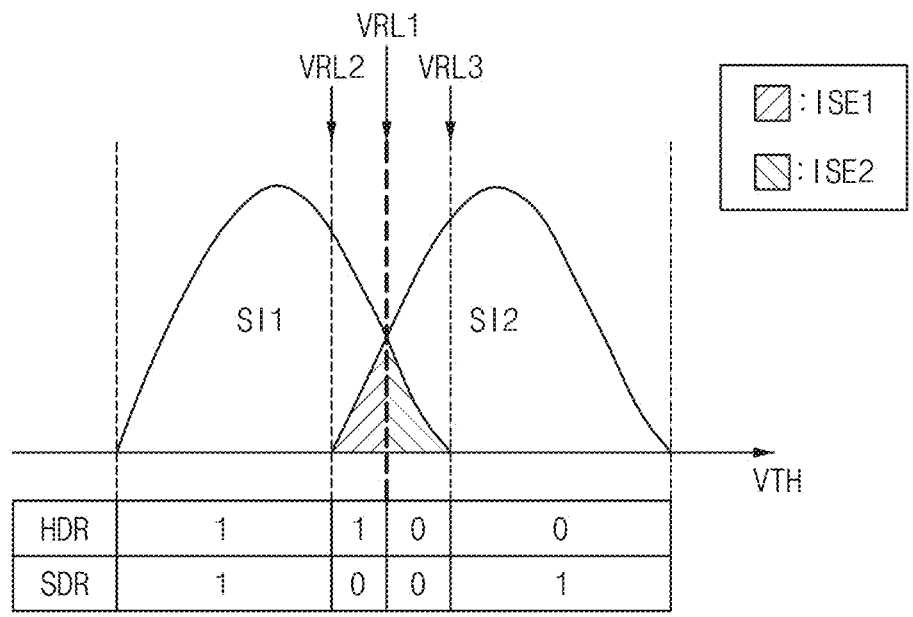
FIGS. 8A and 8B are diagrams for describing operations of FIGS. 5, 6A, 6B, 7A and 7B.
Figure 8B:
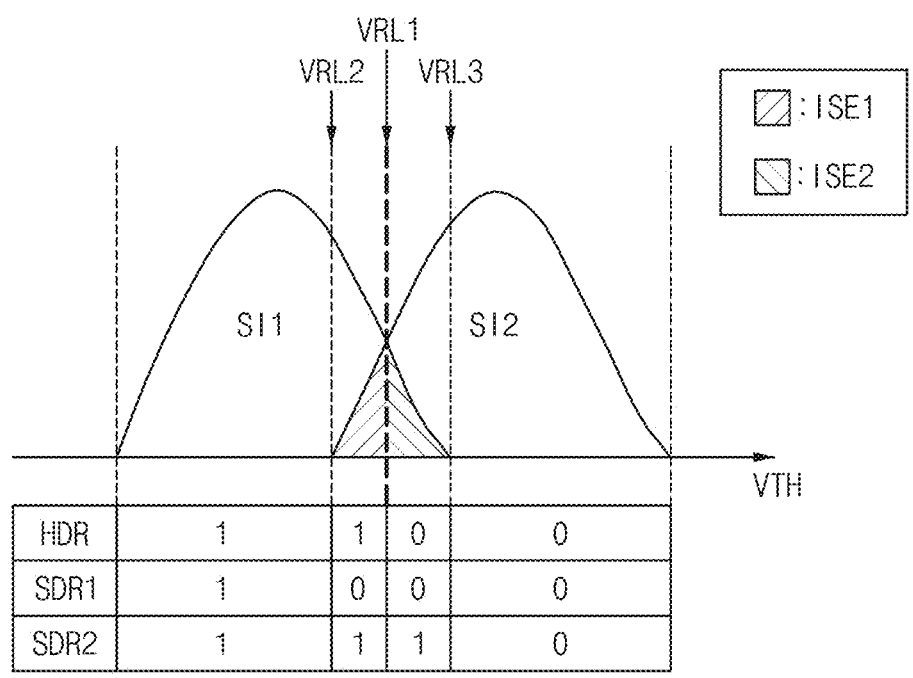

FIG. 5 is a flowchart illustrating an example of performing a hard data read operation in FIG. 1. FIGS. 6A and 6B are flowcharts illustrating examples of performing a soft data read operation in FIG. 1. FIGS. 7A and 7B are flowcharts illustrating examples of classifying memory cells in a source area into normal memory cells and weak memory cells in FIG. 1. FIGS. 8A and 8B are diagrams for describing operations of FIGS. 5, 6A, 6B, 7A and 7B.

Referring to FIGS. 2, 5, 8A and 8B, when performing the hard data read operation (operation S200), each of the memory cells in the source area SA in which the target data TDAT are stored may be determined or identified as the first data value '1' corresponding to the first state SI1 or the second data '0' corresponding to the second state SI2, based on a first read level VRL1 (operation S210).

In some implementations, a result HDR of the hard data read operation may be obtained as illustrated in FIGS. 8A and 8B. For example, the result HDR of the hard data read operation may be obtained by performing operation S210. For example, among the memory cells in the source area SA, memory cells having threshold voltages lower than or equal to the first read level VRL1 may be determined to have the first data value '1', and memory cells having threshold voltages higher than the first read level VRL1 may be determined to have the second data value '0'. Therefore, the memory cells corresponding to the first initial error area ISE1 may be determined such that each memory cell has the first data value '1', and the memory cells corresponding to the second initial error area ISE2 may be determined such that each memory cell has the second data value '0'.

Referring to FIGS. 2, 6A, 7A and 8A, an example of performing the soft data read operation (operation S300) is illustrated, and an example of classifying the memory cells in the source area into the normal memory cells and the weak memory cells (operation S400) is illustrated.

For example, as illustrated in FIGS. 6A and 8A, when performing the soft data read operation (operation S300), each of the memory cells in the source area SA in which the target data TDAT are stored may be determined or identified as the first data value '1' corresponding to the first state SI1 or the second data '0' corresponding to the second state SI2, based on a second read level VRL2 and a third read level VRL3 that are different from the first read level VRL1 (operation S305). For example, the second read level VRL2 may be lower than the first read level VRL1, and may be substantially equal to the second initial target level VSTL2 in FIGS. 4A and 4B. For example, the third read level VRL3 may be higher than the first and second read levels VRL1 and VRL2.

In some implementations, a result SDR of the soft data read operation may be obtained as illustrated in FIG. 8A. For example, the result SDR of the soft data read operation may be obtained by performing operation S305. For example, among the memory cells in the source area SA, memory cells having threshold voltages lower than or equal to the second read level VRL2 may be determined to have the first data value '1', memory cells having threshold voltages higher than the second read level VRL2 and lower than or equal to the third read level VR3 may be determined to have the second data value '0', and memory cells having threshold voltages higher than the third read level VRL3 may be determined to have the first data value '1'.

Therefore, the memory cells having the threshold voltages lower than or equal to the second read level VRL2 may be determined such that both the result HDR of the hard data read operation and the result SDR of the soft data read operation have the first data value '1'. The memory cells corresponding to the first initial error area ISE1 among the initial error areas ISE1 and ISE2, e.g., the memory cells having the threshold voltages higher than the second read level VRL2 and lower than or equal to the first read level VRL1 may be determined such that the result HDR of the hard data read operation has the first data value '1' and the result SDR of the soft data read operation has the second data value '0'. The memory cells corresponding to the second initial error area ISE2 among the initial error areas ISE1 and ISE2, e.g., the memory cells having the threshold voltages higher than the first read level VRL1 and lower than or equal to the third read level VRL3 may be determined such that both the result HDR of the hard data read operation and the result SDR of the soft data read operation have the second data value '0'. The memory cells having the threshold voltages higher than the third read level VRL3 may be determined such that the result HDR of the hard data read operation has the second data value '0' and the result SDR of the soft data read operation has the first data value '1'.

In addition, as illustrated in FIGS. 7A and 8A, when classifying the memory cells in the source area into the normal memory cells and the weak memory cells (operation S400), it may be determined based on the result HDR of the hard data read operation and the result SDR of the soft data read operation whether each memory cell is the normal memory cell or the weak memory cell (operation S405).

When the result SDR of the soft data read operation corresponds to the first data value '1' (operation S405: YES), e.g., when both the result HDR of the hard data read operation and the result SDR of the soft data read operation are the first data value '1', or e.g., when the result HDR of the hard data read operation is the second data value '0' and the result SDR of the soft data read operation is the first data value '1', it may be determined that the corresponding memory cell is the normal memory cell (operation S420), and data (or bits) of the corresponding memory cell may be stored in the first area of the page buffer circuit 30 (or in the first page buffers NPB included in the first area) (operation S425).

When the result SDR of the soft data read operation corresponds to the second data value '0' (operation S405: NO), e.g., when both the result HDR of the hard data read operation and the result SDR of the soft data read operation are the second data value '0', or, e.g., when the result HDR of the hard data read operation is the first data value '1' and the result SDR of the soft data read operation is the second data value '0', it may be determined that the corresponding memory cell is the weak memory cell (operation S430), and data (or bits) of the corresponding memory cell may be stored in the second area of the page buffer circuit 30 (or in the second page buffers WPB included in the second area) (operation S435).

Referring to FIGS. 2, 6B, 7B and 8B, an example of performing the soft data read operation (operation S300) is illustrated, and an example of classifying the memory cells in the source area into the normal memory cells and the weak memory cells (operation S400) is illustrated. The descriptions repeated with or overlapping with descriptions of FIGS. 6A, 7A and 8A will be omitted in the interest of brevity.

For example, as illustrated in FIGS. 6B and 8B, when performing the soft data read operation (operation S300), each of the memory cells in the source area SA in which the target data TDAT are stored may be determined or identified as the first data value '1' corresponding to the first state SI1 or the second data '0' corresponding to the second state SI2, based on a second read level VRL2 that is different from the first read level VRL1 (operation S310).

In addition, each of the memory cells in the source area SA in which the target data TDAT are stored may be determined or identified as the first data value '1' corresponding to the first state SI1 or the second data '0' corresponding to the second state SI2, based on a third read level VRL3 that is different from the first read level VRL1 and the second read level VRL2 (operation S320).

In some implementations, results SDR1 and SDR2 of the soft data read operation may be obtained as illustrated in FIG. 8B. For example, the first result SDR1 of the soft data read operation may be obtained by performing operation S310. For example, among the memory cells in the source area SA, memory cells having threshold voltages lower than or equal to the second read level VRL2 may be determined to have the first data value '1', and memory cells having threshold voltages higher than the second read level VRL2 may be determined to have the second data value '0'. For example, the second result SDR2 of the soft data read operation may be obtained by performing operation S320. For example, among the memory cells in the source area SA, memory cells having threshold voltages lower than or equal to the third read level VRL3 may be determined to have the first data value '1', and memory cells having threshold voltages higher than the third read level VRL3 may be determined to have the second data value '0'. Therefore, in the first result SDR1 of the soft data read operation, all of the memory cells corresponding to the initial error areas ISE1 and ISE2 may be determined such that each memory cell has the second data value '0'. In the second result SDR2 of the soft data read operation, all of the memory cells corresponding to the initial error areas ISE1 and ISE2 may be determined such that each memory cell has the first data value '1'.

In addition, as illustrated in FIGS. 7B and 8B, when classifying the memory cells in the source area into the normal memory cells and the weak memory cells (operation S400), it may be determined based on the result HDR of the hard data read operation and the results SDR1 and SDR2 of the soft data read operation whether each memory cell is the normal memory cell or the weak memory cell (operation S410).

When the result HDR of the hard data read operation and the results SDR1 and SDR2 of the soft data read operation are equal to one another (operation S410: YES), it may be determined that the corresponding memory cell is the normal memory cell (operation S420), and data (or bits) of the corresponding memory cell may be stored in the first area of the page buffer circuit 30 (or in the first page buffers NPB included in the first area) (operation S425). For example, data of the memory cells in which all of the results HDR, SDR1 and SDR2 corresponds to the first data value '1' because the threshold voltages are lower than or equal to the second read level VRL2 may be stored in the first area of the page buffer circuit 30. For example, data of the memory cells in which all of the results HDR, SDR1 and SDR2 correspond to the second data value '0' because the threshold voltages are higher than the third read level VRL3 may be stored in the first area of the page buffer circuit 30.

When the result HDR of the hard data read operation and the results SDR1 and SDR2 of the soft data read operation are different from one another (operation S410: NO), it may be determined that the corresponding memory cell is the weak memory cell (operation S430), and data (or bits) of the corresponding memory cell may be stored in the second area of the page buffer circuit 30 (or in the second page buffers WPB included in the second area) (operation S435). For example, data of the memory cells in which the results HDR and SDR2 correspond to the first data value '1' and the result SDR1 corresponds to the second data value '0' because the threshold voltages are higher than the second read level VRL2 and lower than or equal to the first read level VRL1 may be stored in the second area of the page buffer circuit 30. For example, data of the memory cells in which the result SDR2 corresponds to the first data value '1' and the results HDR and SDR1 correspond to the second data value '0' because the threshold voltages are higher than the first read level VRL1 and lower than the third read level VRL3 may be stored in the second area of the page buffer circuit 30.

As described above, two different read operations (e.g., the hard data read operation and the soft data read operation) may be performed, the first data NTD corresponding to the normal memory cells and the second data WTD corresponding to the weak memory cells may be classified based on the two different read operations, and the first data NTD and the second data WTD may be internally and separately stored (e.g., separately stored in the page buffer circuit 30). Accordingly, preparations for copying the target data TDAT while maintaining the threshold voltage distribution may be completed.

In some implementations, not only the memory cells corresponding to the initial error areas ISE1 and ISE2, but memory cells corresponding to unhatched areas between the second and third read levels VRL2 and VRL3 may also be determined as weak memory cells.

Figure 9:
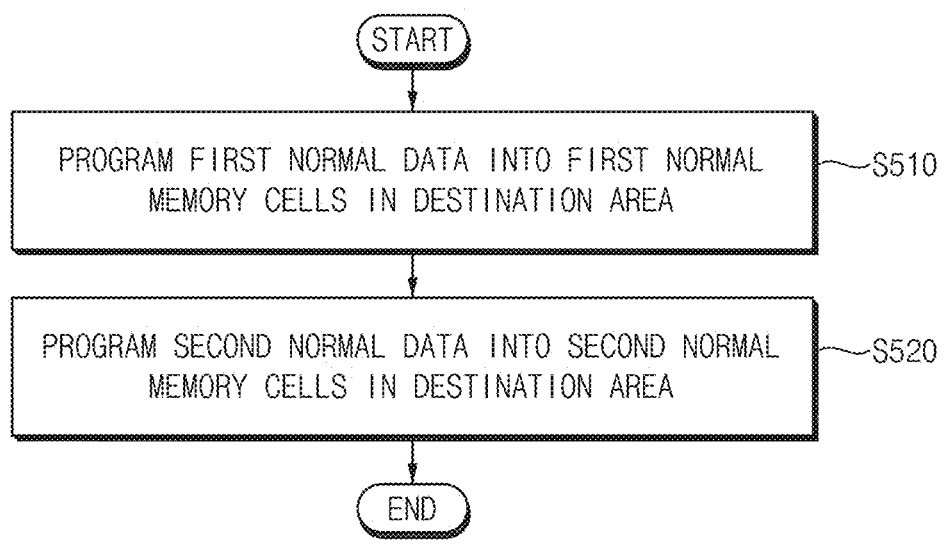
FIG. 9 is a flowchart illustrating an example of performing a first copyback program operation in FIG. 1.
Figure 10:
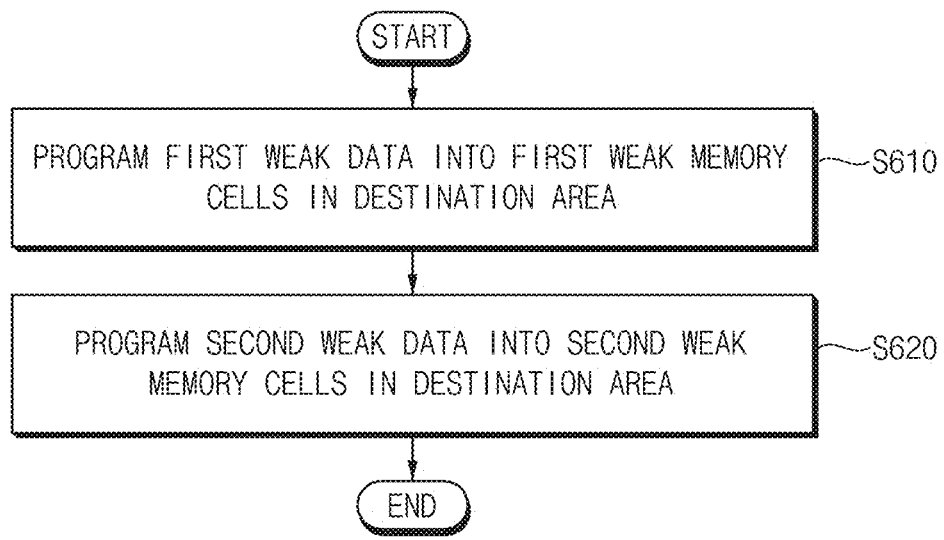
FIG. 10 is a flowchart illustrating an example of performing a second copyback program operation in FIG. 1.
Figure 11:
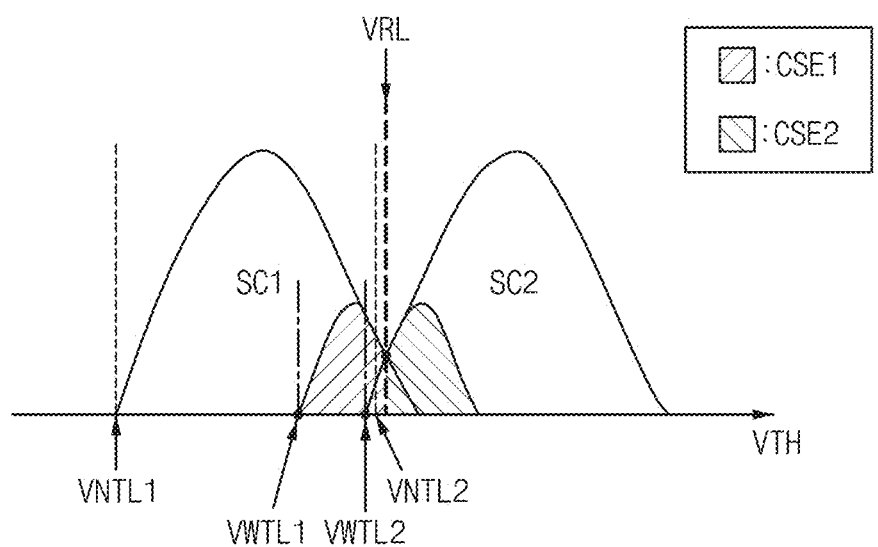
FIGS. 11, 12A and 12B are diagrams for describing operations of FIGS. 9 and 10.
Figure 12A:
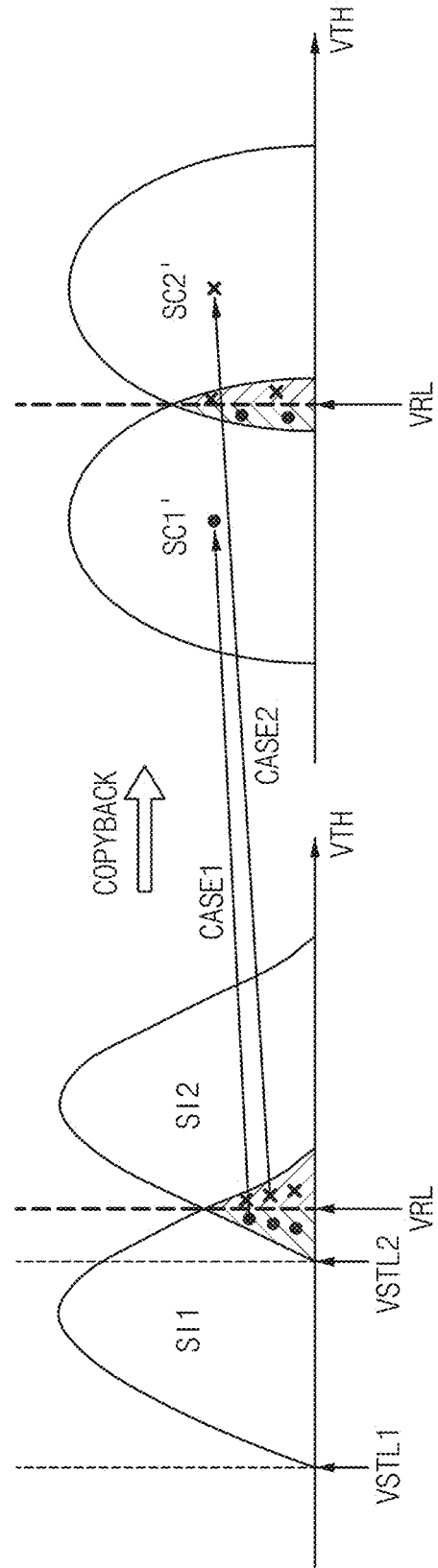
Figure 12B:
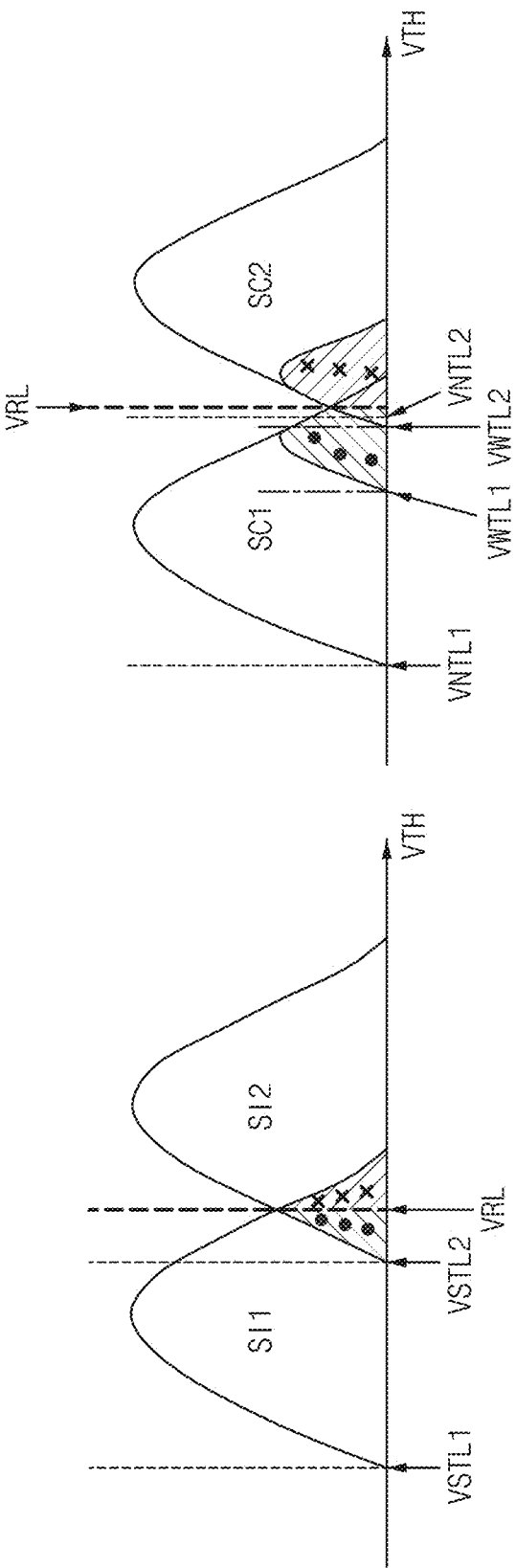

FIG. 9 is a flowchart illustrating an example of performing a first copyback program operation in FIG. 1. FIG. 10 is a flowchart illustrating an example of performing a second copyback program operation in FIG. 1. FIGS. 11, 12A and 12B are diagrams for describing operations of FIGS. 9 and 10.

Referring to FIGS. 2, 9 and 11, when performing the first copyback program operation based on the second voltage levels (operation S500), first normal data among the first data NTD (or among the data NCD corresponding to the first data NTD) may be programmed into first normal memory cells among the memory cells in the destination area DA (operation S510), and second normal data among the first data NTD may be programmed into second normal memory cells among the memory cells in the destination area DA (operation S520). The first normal data may correspond to the first state SI1, and the second normal data may correspond to the second state SI2.

Referring to FIGS. 2, 10 and 11, when performing the second copyback program operation based on the third voltage levels (operation S600), first weak data among the second data WTD (or among the data WCD corresponding to the second data WTD) may be programmed into first weak memory cells among the memory cells in the destination area DA (operation S610), and second weak data among the second data WTD may be programmed into second weak memory cells among the memory cells in the destination area (operation S620). The first weak data may correspond to the first state SI1, and the second weak data may correspond to the second state SI2.

When the above-described first and second copyback program operations are performed, the copy data CDAT having a first copy state SC1 and a second copy state SC2 that are substantially the same as the first state SI1 and second state SI2 of the target data TDAT, may be stored in the destination area DA.

In some implementations, the second voltage levels may include a first normal target level (or strong target level) VNTL1 and a second normal target level VNTL2. When operation S510 is performed based on the first normal target level VNTL1, the first state SI1 (or the first copy state SC1 corresponding to the first state SI1) may be formed on the first normal memory cells of the destination area DA. When operation S520 is performed based on the second normal target level VNTL2, the second state SI2 (or the second copy state SC2 corresponding to the second state SI2) may be formed on the second normal memory cells of the destination area DA.

In some implementations, the first normal target level VNTL1 and the second normal target level VNTL2 may be substantially the same as the first initial target level VSTL1 and the second initial target level VSTL2 in FIG. 3. In other implementations, the first normal target level VNTL1 and the second normal target level VNTL2 may be different from as the first initial target level VSTL1 and the second initial target level VSTL2 in FIG. 3. Alternatively, appropriate voltage levels may be selected and used to form the first copy state SC1 and the second copy state SC2 that are substantially the same as the first state SI1 and the second state SI2.

In some implementations, the third voltage levels may include a first weak target level VWTL1 and a second weak target level VWTL2. When operation S610 is performed based on the first weak target level VWTL1, a portion of the first state SI1 (or a portion of the first copy state SC1 corresponding to the portion of the first state SI1) may be formed on the first weak memory cells of the destination area DA. When operation S620 is performed based on the second weak target level VWTL2, a portion of the second state SI2 (or a portion of the second copy state SC2 corresponding to the portion of the second state SI2) may be formed on the second weak memory cells of the destination area DA.

In some implementations, a threshold voltage distribution formed on the first weak memory cells of the destination area DA based on the first weak target level VWTL1 may correspond to a first copy error area CSE1, and a threshold voltage distribution formed on the second weak memory cells of the destination area DA based on the second weak target level VWTL2 may correspond to a second copy error area CSE2. For example, the first copy error area CSE1 may correspond to the first initial error area ISE1 in FIGS. 8A and 8B, and may correspond to memory cells in which threshold voltages are higher than the second read level VRL2 and lower than or equal to the first read level VRL1. For example, the second copy error area CSE2 may correspond to the second initial error area ISE2 in FIGS. 8A and 8B, and may correspond to memory cells in which threshold voltages are higher than the first read level VRL1 and lower than or equal to the third read level VRL3.

In some implementations, as illustrated in FIG. 11, both the first weak target level VWTL1 and the second weak target level VWTL2 may be lower than the second general target level VNTL2. However, some implementations are not limited thereto, and appropriate voltage levels may be selected and used to form the first copy state SC1 and the second copy state SC2 that are substantially the same as the first state SI1 and the second state SI2.

In some implementations, the first copyback program operation and the second copyback program operation may be performed based on the ISPP scheme. For example, at least one of the first normal target level VNTL1, the second normal target level VNTL2, the first weak target level VWTL1 and the second weak target level VWTL2 in FIG. 11 may be the voltage level of the program voltage VPGM of the program loop that is finally performed (e.g., successfully completed) in the ISPP scheme.

As described above, two different program operations (e.g., the first copyback program operation and the second copyback program operation) may be performed on the data NTD or NCD of the normal memory cells and the data WTD or WCD of the weak memory cells that are separately and/or independently stored. Accordingly, the copy data CDAT having the threshold voltage distribution substantially the same as that of the target data TDAT may be efficiently stored in the destination area DA.

Based on the feature in that the threshold voltage distribution of the normal memory cells in the source area SA and the threshold voltage distribution of the first memory cells (e.g., the normal destination memory cells) in the destination area DA are substantially the same, and based on the feature in that the threshold voltage distribution of the weak memory cells in the source area SA and the threshold voltage distribution of the second memory cells (e.g., the weak destination memory cells) in the destination area DA are substantially the same, it may be determined that the same results of the read operation are obtained under the same condition. The feature in that the threshold voltage distribution is substantially the same may be described by the feature in that the threshold voltage distribution is maintained.

For example, a result of reading the target data TDAT that are stored in the source area SA and have the first state SI1 and the second state SI2 in FIG. 3B using the read level VRL may be substantially the same as a result of reading the copy data CDAT that are stored in the destination area DA and have the first copy state SC1 and the second copy state SC2 in FIG. 11 using the read level VRL.

In other words, when a threshold voltage level of a first source memory cell in the source area SA is lower (or higher) than the read level VRL before the internal copyback operation, a threshold voltage level of a first destination memory cell in the destination area DA corresponding to the first source memory cell may also be lower or higher than the read level VRL after the internal copyback operation.

In addition, when a result of the hard data read operation and a result of the soft data read operation for a second source memory cell in the source area SA are the same as (or different from) each other before the internal copyback operation, a result of the hard data read operation and a result of the soft data read operation for a second destination memory cell in the destination area DA corresponding to the second source memory cell may also be the same as (or different from) each other after the internal copyback operation.

In some implementations, the areas where the result SDR of the soft data read operation has the second data value '0' in FIG. 8A and the areas where the result HDR of the hard data read operation and the results SDR1 and SDR2 of the soft data read operation are different from each other in FIG. 8B may correspond to the copy error areas CSE1 and CSE2 in FIG. 11. In some implementations, the areas where the result SDR of the soft data read operation has the first data value '1' in FIG. 8A and the areas where the result HDR of the hard data read operation and the results SDR1 and SDR2 of the soft data read operation are the same as each other in FIG. 8B may correspond to the remaining areas other than the copy error areas CSE1 and CSE2. In some implementations, the initial error areas ISE1 and ISE2 in FIG. 8 may correspond to the copy error areas CSE1 and CSE2 in FIG. 11, and the remaining areas other than the initial error areas ISE1 and ISE2 may correspond to the remaining areas other than the copy error areas CSE1 and CSE2.

Referring to FIG. 12A, an example of a conventional copyback operation without the ECC operation is illustrated.

When the conventional copyback operation without the ECC operation is performed, and when the first and second states SI1 and SI2 are changed to first and second copy states SC1' and SC2', there may be problems of CASE1 and/or CASE2. In CASE1, a soft error in the first initial error area ISE1 may be changed into an uncorrectable error or a hard error. In CASE2, a soft error in the second initial error area ISE2 may be changed into an uncorrectable error or a hard error.

Referring to FIG. 12B, an example of the internal copyback operation according to some implementations is illustrated.

When the internal copyback operation according to some implementations is performed, and when the memory cells in the destination area DA have the first and second copy states SC1 and SC2 that are substantially the same as the first and second states SI1 and SI2, soft errors in the initial error areas ISE1 and ISE2 may be maintained, and it may be prevented that the soft errors in the initial error areas ISE1 and ISE2 are degenerated into hard errors. Accordingly, the occurrence of additional hard errors may be prevented without using an input/output (I/O) bus or without the ECC operation, the efficient copyback operation may be performed, and the performance of the nonvolatile memory device may be improved or enhanced.

In some implementations, the internal copyback operation according to some implementations may be applied or employed to two adjacent program states among the plurality of program states. For example, the internal copyback operation including the distribution copy operation according to some implementations may be performed for each of the adjacent program states P1$m$ and P2$m$ in FIG. 3B and the adjacent program states P2$m$ and P3$m$ in FIG. 3B. Similarly, the internal copyback operation including the distribution copy operation according to some implementations may be performed for each of the adjacent program states P1$t$ and P2$t$ in FIG. 3C, the adjacent program states P2$t$ and P3$t$ in FIG. 3C, the adjacent program states P3$t$ and P4$t$ in FIG. 3C, the adjacent program states P4$t$ and P5$t$ in FIG. 3C, the adjacent program states P5$t$ and P6$t$ in FIG. 3C and the adjacent program states P6$t$ and P7$t$ in FIG. 3C. Alternatively, the internal copyback operation including the distribution copy operation according to some implementations may be performed for each of the adjacent program states P1$q$ and P2$q$ in FIG. 3D, the adjacent program states P2$q$ and P3$q$ in FIG. 3D, the adjacent program states P3$q$ and P4$q$ in FIG. 3D, the adjacent program states P4$q$ and P5$q$ in FIG. 3D, the adjacent program states P5$q$ and P6$q$ in FIG. 3D, the adjacent program states P6$q$ and P7$q$ in FIG. 3D, the adjacent program states P7$q$ and P8$q$ in FIG. 3D, the adjacent program states P8$q$ and P9$q$ in FIG. 3D, the adjacent program states P9$q$ and P10$q$ in FIG. 3D, the adjacent program states P10$q$ and P11$q$ in FIG. 3D, the adjacent program states P11$q$ and P12$q$ in FIG. 3D, the adjacent program states P12$q$ and P13$q$ in FIG. 3D, the adjacent program states P13$q$ and P14$q$ in FIG. 3D and the adjacent program states P14$q$ and P15$q$ in FIG. 3D.

Figure 13A:
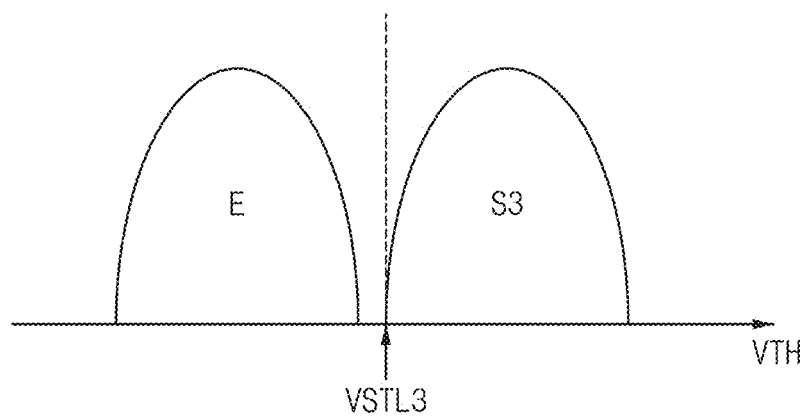
FIGS. 13A, 13B and 13C are diagrams for describing a method of performing a copyback operation in a nonvolatile memory device according to some implementations.
Figure 13B:
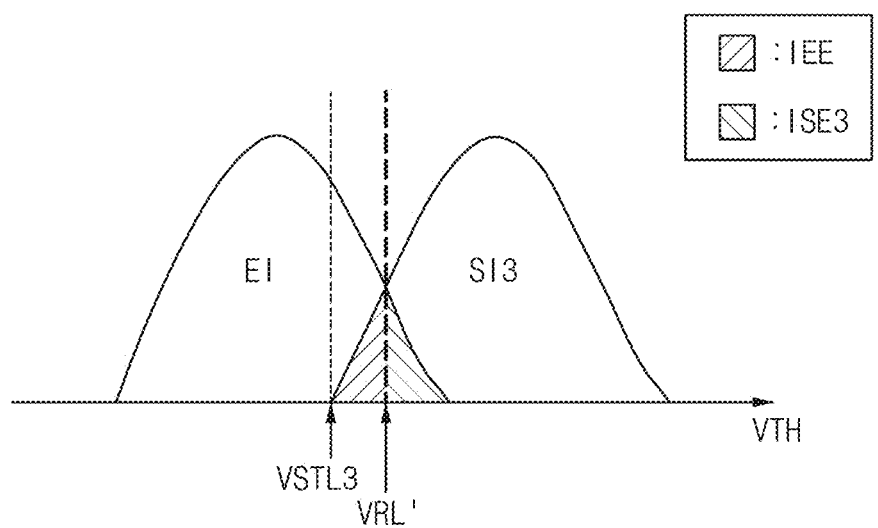
Figure 13C:
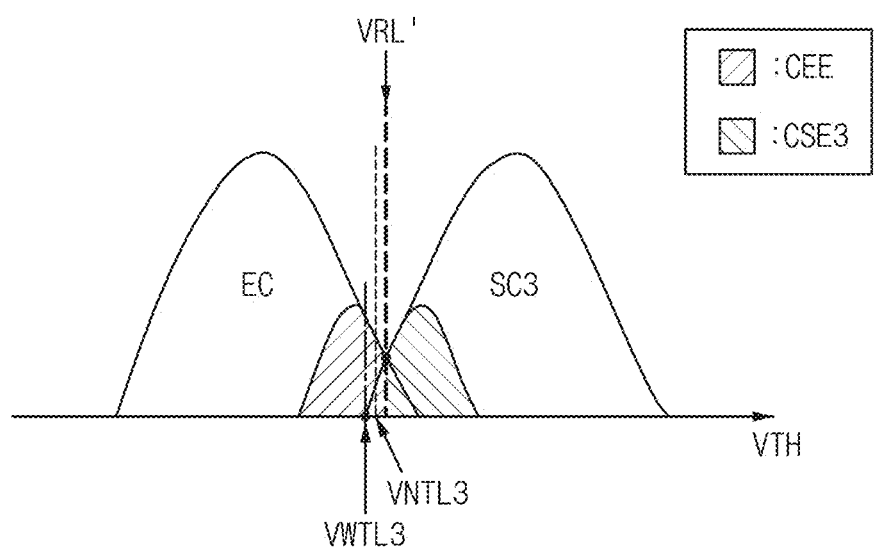

FIGS. 13A, 13B and 13C are diagrams for describing a method of performing a copyback operation in a nonvolatile memory device according to some implementations. The descriptions repeated with or overlapping with descriptions of FIGS. 4A, 4B and 11 will be omitted in the interest of brevity.

Referring to FIGS. 13A and 13B, an example of a threshold voltage distribution of the target data TDAT stored in the source area SA of the memory cell array 20 is illustrated. FIG. 13A illustrates a threshold voltage distribution immediately after the initial program operation is performed, and FIG. 13B illustrates that the threshold voltage distribution of FIG. 13A is degraded over time.

In some implementations, each of the plurality of memory cells included in the memory cell array 20 may store an arbitrary number of data bits. For example, a third initial state E in FIG. 13A and a third state EI in FIG. 13B may be one of the erase states E in FIGS. 3A, 3B, 3C and 3D, and a fourth initial state S3 in FIG. 13A and a fourth state SI3 in FIG. 13B may be one of the program states P1$s$, P1$m$, P1$t$ and P1$q$ in FIGS. 3A, 3B, 3C and 3D adjacent to the erase states E.

For example, as illustrated in FIG. 13A, the third initial state (e.g., the erase state) E may be formed on all memory cells by the erase operation, and then some memory cells may be programmed by performing the initial program operation such that each memory cell has the fourth initial state S3.

For example, as illustrated in FIG. 13B, as the threshold voltage distribution is degraded or deteriorated, the third initial state E and the fourth initial state S3 may be changed to the third state EI and the fourth state SI3. When the threshold voltage distribution is degraded as illustrated in FIG. 13B, initial error areas IEE and ISE3 may occur as compared with immediately after the initial program operation is performed described with reference to FIG. 13A, even if a read operation is performed using an optimal read level VRL'.

With respect to the third state EI and fourth state SI3 illustrated in FIG. 13B, the hard data read operation and the soft data read operation may be performed as described with reference to FIGS. 5, 6A, 6B, 7A, 7B, 8A and 8B.

When the copyback program operation is performed according to some implementations, a third copy state EC that is substantially the same as the third state EI may be formed by performing the erase operation, a fourth copy state SC3 that is substantially the same as the fourth state SI3 may be formed using a third normal target level VNTL3 and a third weak target level VWTL3, and thus the distribution copy operation may be performed and completed. Copy error areas CEE and CSE3 may correspond to the initial error areas IEE and ISE3.

Figure 14:
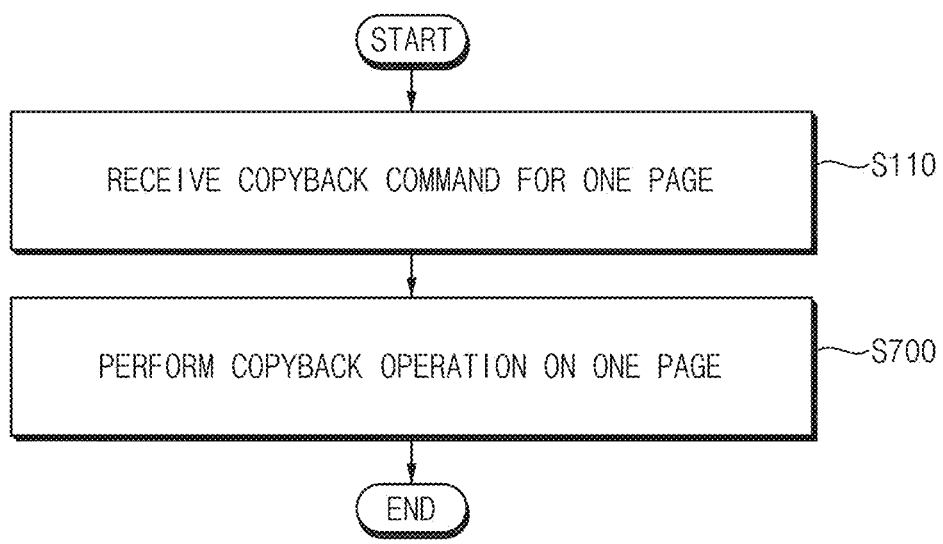
FIGS. 14, 15 and 16 are flowcharts illustrating a method of performing a copyback operation in a nonvolatile memory device according to some implementations.
Figure 15:
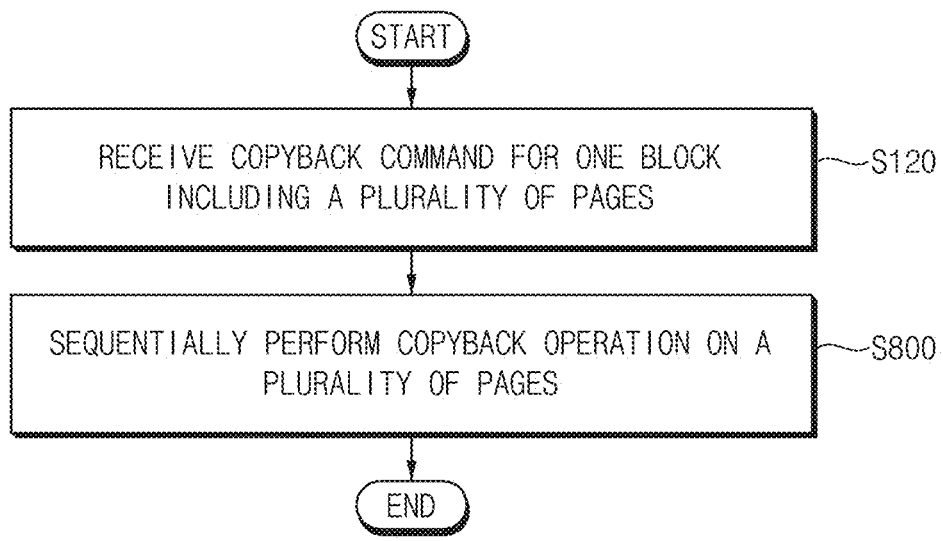
Figure 16:
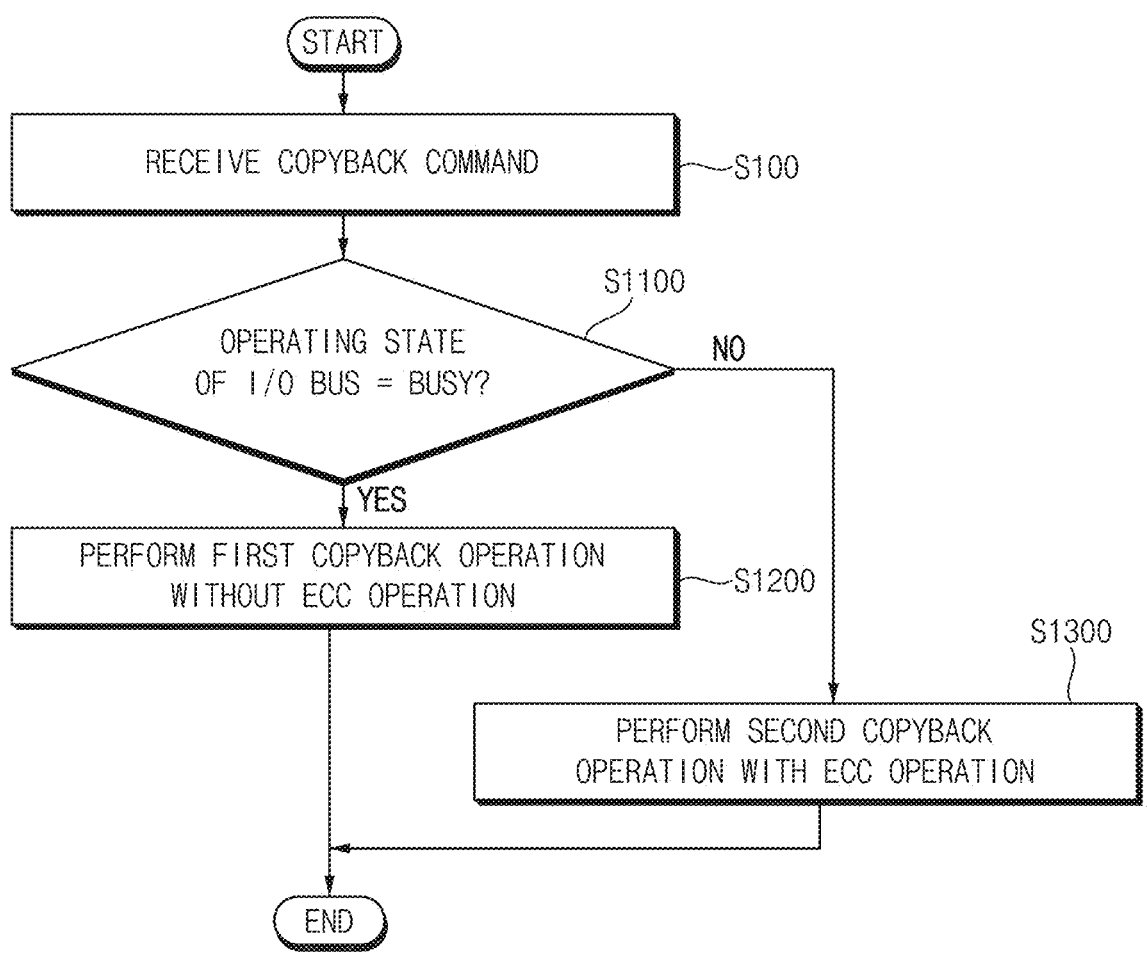

FIGS. 14, 15 and 16 are flowcharts illustrating a method of performing a copyback operation in a nonvolatile memory device according to some implementations. The descriptions repeated with or overlapping with descriptions of FIG. 1 will be omitted in the interest of brevity.

Referring to FIG. 14, in a method of performing a copyback operation in a nonvolatile memory device according to some implementations, a copyback command for one page may be received (operation S110), and a copyback operation may be performed on the one page based on the copyback command (operation S700). For example, operation S110 may correspond to operation S100 in FIG. 1, and operation S700 may include operations S200, S300, S400, S500 and S600 in FIG. 1. FIG. 14 illustrates an example where the copyback command is received by units of pages (or on a page basis) and the copyback operation is performed by units of pages.

Referring to FIG. 15, in a method of performing a copyback operation in a nonvolatile memory device according to some implementations, a copyback command for one block including a plurality of pages may be received (operation S120), and a copyback operation may be sequentially performed on the plurality of pages based on the copyback command (operation S800).

For example, operation S120 may correspond to operation S100 in FIG. 1, and operation S800 may include operations S200, S300, S400, S500 and S600 in FIG. 1. FIG. 15 illustrates an example where the copyback command is received by units of blocks (or on a block basis) and the copyback operation is performed by units of pages within the block.

Referring to FIG. 16, in a method of performing a copyback operation in a nonvolatile memory device according to some implementations, operation S100 may be substantially the same as that described with reference to FIG. 1.

Before the copyback operation is performed based on the copyback command, the operating state (or status) of an input/output (I/O) bus of the nonvolatile memory device may be checked. For example, the I/O bus may include an interface for receiving or outputting commands and/or data.

When the operating state of the I/O bus is busy (operation S1100: YES), a first copyback operation may be performed without the ECC operation (operation S1200). For example, the first copyback operation may be the internal copyback operation including a distribution copy operation according to some implementations described above with reference to FIGS. 1 through 13B. For example, operation S1200 may include operations S200, S300, S400, S500 and S600 in FIG. 1.

When the operating state of the I/O bus is not busy (operation S1100: NO), a second copyback operation may be performed with the ECC operation (operation S1300). F or example, the second copyback operation may be similar to a conventional copyback operation.

In some implementations, when the number of write/read commands to be processed (e.g., write/read commands waiting in a command queue) at a specific time point and/or during a specific time interval is greater than a reference number, and/or when a size (or capacity) of data input or output at a specific time point and/or during a specific time interval is greater than a reference size, it may be determined that the operating state of the I/O bus is busy. For example, when a sequential read operation or a sequential write operation is being performed, it may be determined that the operating state of the I/O bus is busy. In some implementations, when the nonvolatile memory device is in an idle state other than the busy state, when the number of write/read commands to be processed is smaller than or equal to the reference number, and/or when the size of data input or output is smaller than or equal to the reference size, it may be determined that the operating state of the I/O bus is not busy.

In the method of performing the copyback operation in the nonvolatile memory device according to some implementations, the first copyback operation and the second copyback operation may be selectively performed depending on the operating state of the I/O bus. Accordingly, the efficient copyback operation may be performed, and the performance of the nonvolatile memory device may be improved or enhanced.

Figure 17:
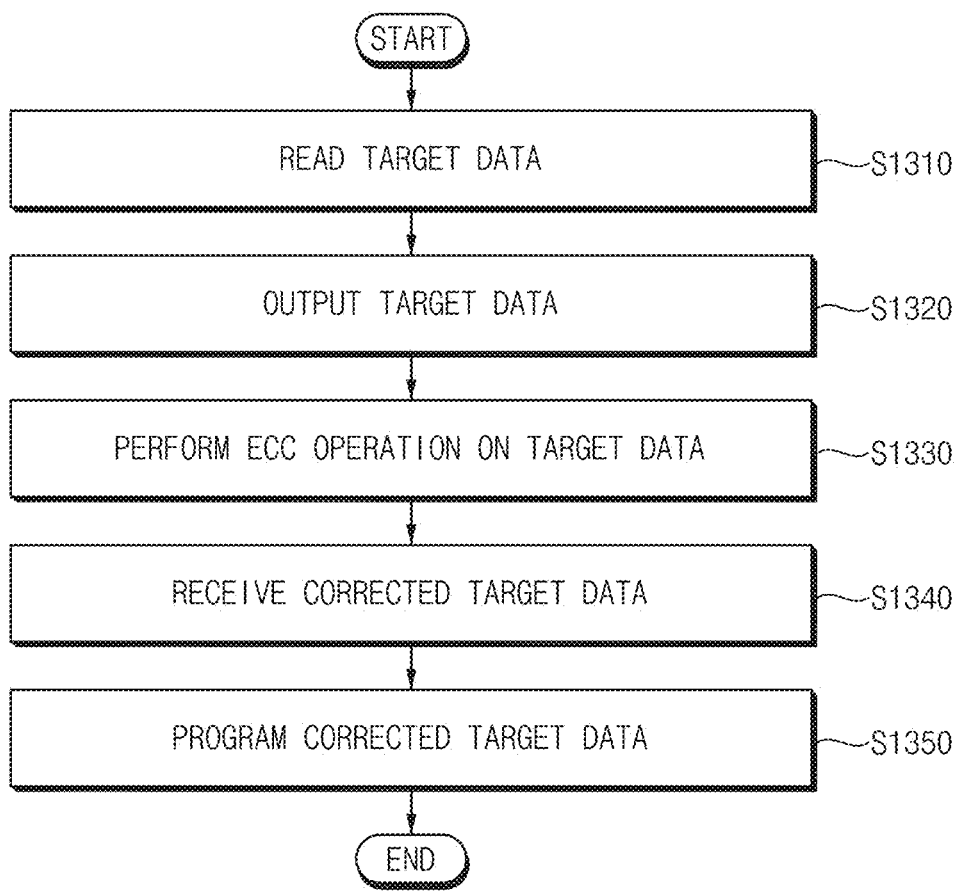
FIG. 17 is a flowchart illustrating an example of performing a second copyback operation in FIG. 16.

FIG. 17 is a flowchart illustrating an example of performing a second copyback operation in FIG. 16.

Referring to FIGS. 16 and 17, when performing the second copyback operation (operation S1300), the target data may be read or retrieved from the source area (operation S1310), the target data may be output (operation S1320), the ECC operation may be performed on the target data (operation S1330), the target data corrected by the ECC operation may be received (operation S1340), and the corrected target data may be programmed into the destination area (operation S1350).

In some implementations, the ECC operation in S1330 may be an external ECC operation performed the outside the nonvolatile memory device. In some implementations, the ECC operation in S1330 may be an internal ECC operation performed inside the nonvolatile memory device.

Figure 18A:
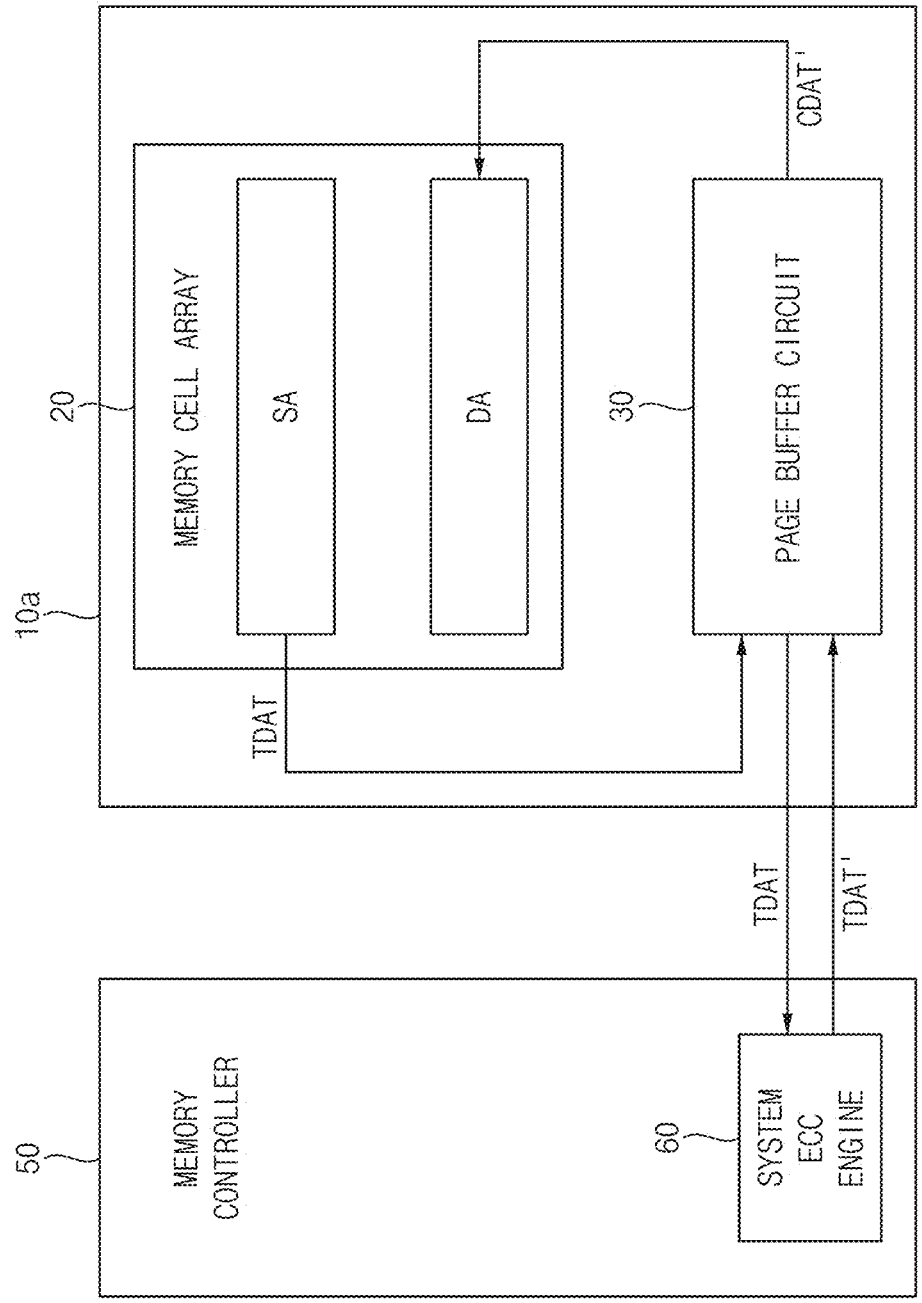
FIGS. 18A and 18B are diagrams for describing operations of FIGS. 16 and 17.
Figure 18B:
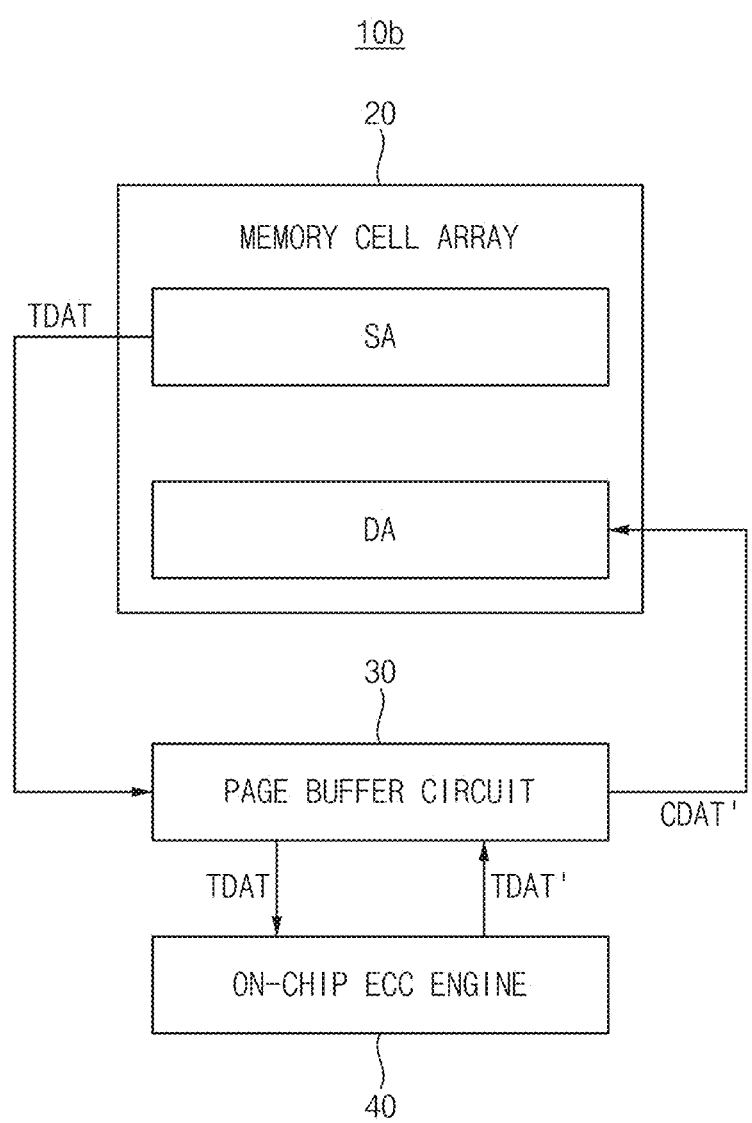

FIGS. 18A and 18B are diagrams for describing operations of FIGS. 16 and 17. The descriptions repeated with or overlapping with descriptions of FIG. 2 will be omitted in the interest of brevity.

Referring to FIG. 18A, a nonvolatile memory device 10a that performs the second copyback operation in FIGS. 16 and 17 and performs the external ECC operation is illustrated.

A memory controller 50 may control an operation of the nonvolatile memory device 10a, and includes a system ECC engine 60 that performs the ECC operation.

The page buffer circuit 30 may temporarily store the target data TDAT, and may output the target data TDAT to the memory controller 50 located outside the nonvolatile memory device 10a. The system ECC engine 60 included in the memory controller 50 may generate corrected target data TDAT' by performing the ECC operation on the target data TDAT. The page buffer circuit 30 may receive the corrected target data TDAT' from the memory controller 50, and may temporarily store the corrected target data TDAT'. Corrected copy data CDAT' corresponding to the corrected target data TDAT' may be stored in the destination area DA.

Referring to FIG. 18B, a nonvolatile memory device 10b that performs the second copyback operation in FIGS. 16 and 17 and performs the internal ECC operation is illustrated.

The nonvolatile memory device 10b includes a memory cell array 20 and a page buffer circuit 30, and may further include an on-chip ECC engine 40.

The page buffer circuit 30 may temporarily store target data TDAT, and may output the target data TDAT to the on-chip ECC engine 40. The on-chip ECC engine 40 may generate corrected target data TDAT' by performing the ECC operation on the target data TDAT. The page buffer circuit 30 may receive the corrected target data TDAT' from the on-chip ECC engine 40, and may temporarily store the corrected target data TDAT'. Corrected copy data CDAT' corresponding to the corrected target data TDAT' may be stored in the destination area DA.

Unlike the example of FIG. 2, when the target data TDAT is temporarily stored in the page buffer circuit 30 in the examples of FIGS. 18A and 18B, the first data NTD and the second data WTD may not be separately stored.

Figure 19:
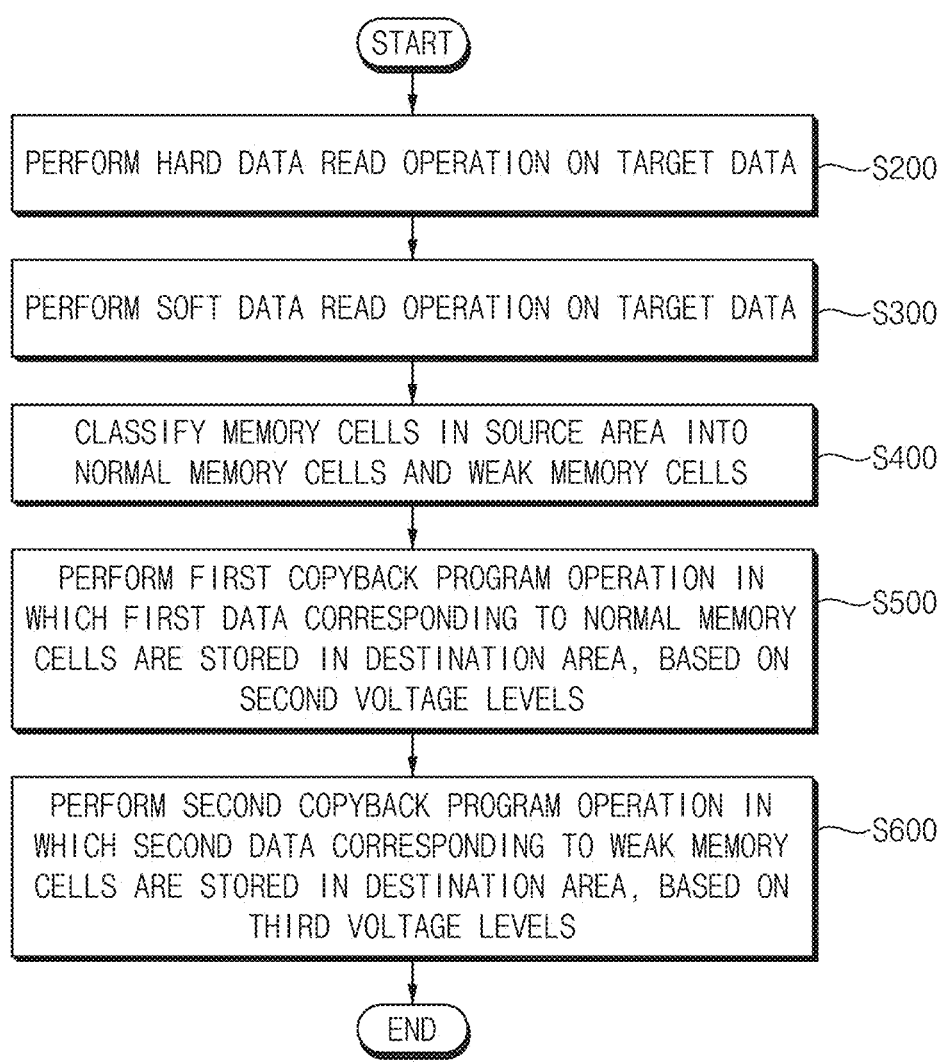
FIG. 19 is a flowchart illustrating a method of performing a copyback operation in a nonvolatile memory device according to some implementations.

FIG. 19 is a flowchart illustrating a method of performing a copyback operation in a nonvolatile memory device according to some implementations. The descriptions repeated with or overlapping with descriptions of FIG. 1 will be omitted in the interest of brevity.

Referring to FIG. 19, in a method of performing a copyback operation in a nonvolatile memory device according to some implementations, FIG. 19 may be substantially the same as FIG. 1, except that operation S100 is omitted. In other words, the nonvolatile memory device may perform the copyback operation by itself without receiving the copyback command.

In some implementations, the operation of receiving the copyback command may be omitted in the examples of FIGS. 14, 15 and 16

Figure 20:
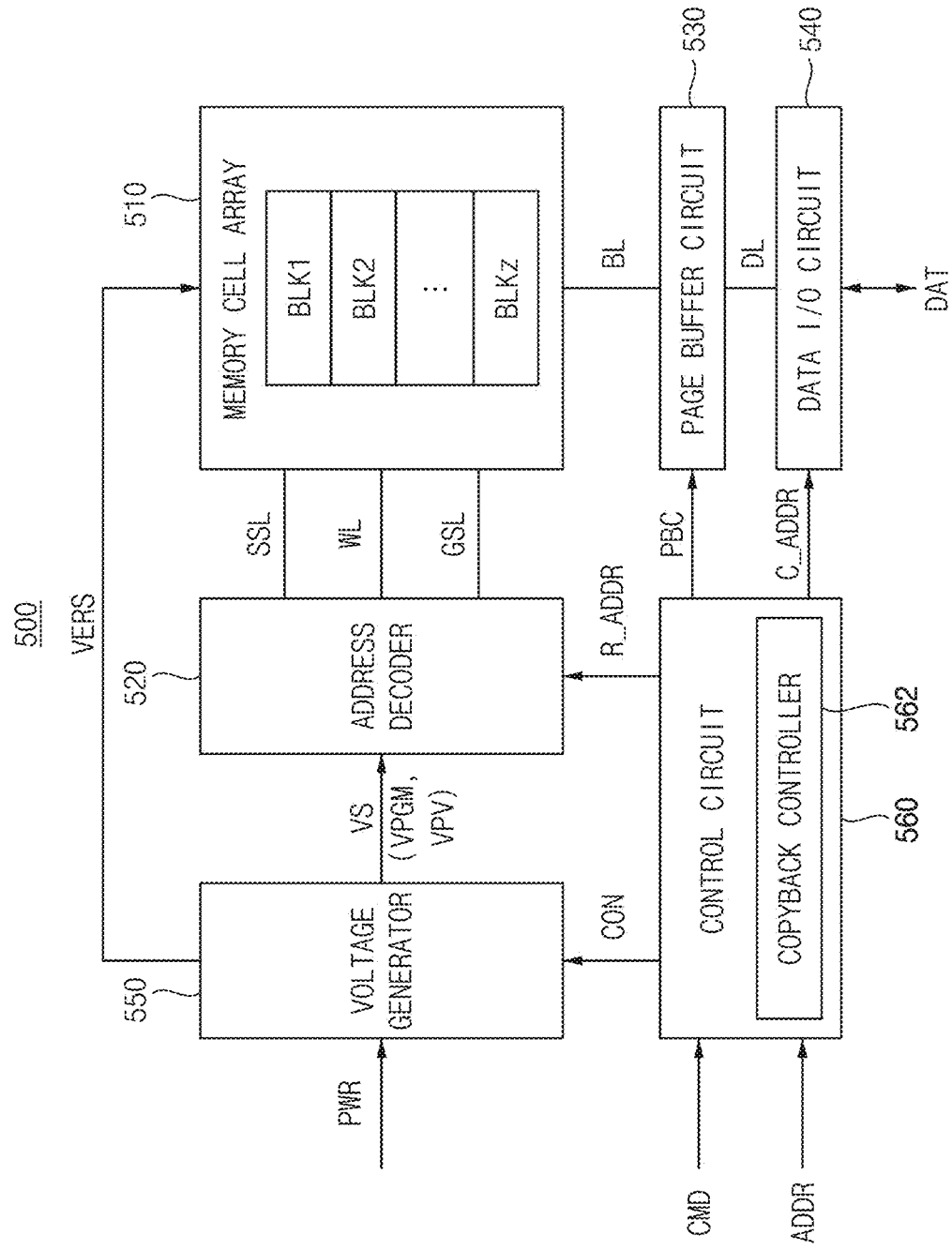
FIG. 20 is a block diagram illustrating a nonvolatile memory device according to some implementations.

FIG. 20 is a block diagram illustrating a nonvolatile memory device according to some implementations.

Referring to FIG. 20, a nonvolatile memory device 500 includes a memory cell array 510, a page buffer circuit 530 and a control circuit 560. The nonvolatile memory device 500 may further include an address decoder 520, a data input/output (I/O) circuit 540 and a voltage generator 550.

The memory cell array 510 is connected to the address decoder 520 via a plurality of string selection lines SSL, a plurality of wordlines WL and a plurality of ground selection lines GSL. The memory cell array 510 is further connected to the page buffer circuit 530 via a plurality of bitlines BL. The memory cell array 510 may include a plurality of memory cells (e.g., a plurality of nonvolatile memory cells) that are connected to the plurality of wordlines WL and the plurality of bitlines BL. The memory cell array 510 may be divided into a plurality of memory blocks BLK1, BLK2, . . . , BLKz each of which includes memory cells. In addition, each of the plurality of memory blocks BLK1 to BLKz may be divided into a plurality of pages.

The control circuit 560 receives a command CMD and an address ADDR from outside (e.g., an external memory controller) of the nonvolatile memory device 500, and controls an erasure procedure, a programming procedure and/or a read operation of the nonvolatile memory device 500 based on the command CMD and the address ADDR. An erasure procedure may include performing a sequence of erase loops, and a programming procedure may include performing a sequence of program loops. Each erase loop may include an erase execution operation and an erase verification operation. Each program loop may include a program execution operation and a program verification operation. The read operation may include a normal read operation and a data recovery read operation.

For example, the control circuit 560 may generate control signals CON, which are used for controlling the voltage generator 550, and may generate control signals PBC for controlling the page buffer circuit 530, based on the command CMD, and may generate a row address R_ADDR and a column address C_ADDR based on the address ADDR. The control circuit 560 may provide the row address R_ADDR to the address decoder 520 and may provide the column address C_ADDR to the data I/O circuit 540.

The control circuit 560 may control the address decoder 520, the page buffer circuit 530, the data I/O circuit 540 and the voltage generator 550 such that the nonvolatile memory device 500 performs the method of performing the copyback operation according to some implementations described with reference to FIGS. 1 through 19. For example, the control circuit 560 may include a copyback controller 562 that controls the copyback operation.

The address decoder 520 may be connected to the memory cell array 510 via the plurality of string selection lines SSL, the plurality of wordlines WL and the plurality of ground selection lines GSL. For example, in the data erase/program/read operations, the address decoder 520 may determine at least one of the plurality of wordlines WL as a selected wordline, may determine at least one of the plurality of string selection lines SSL as a selected string selection line, and may determine at least one of the plurality of ground selection lines GSL as a selected ground selection line, based on the row address R_ADDR.

The voltage generator 550 may generate voltages VS that are required for an operation of the nonvolatile memory device 500 based on a power PWR and the control signals CON. The voltages VS may be applied to the plurality of string selection lines SSL, the plurality of wordlines WL and the plurality of ground selection lines GSL via the address decoder 520. For example, the voltages VS may include a program voltage VPGM and a program verification voltage VPV required for the program loop, etc. In addition, the voltage generator 550 may generate an erase voltage VERS that is required for the data erase operation based on the power PWR and the control signals CON. The erase voltage VERS may be applied to the memory cell array 510 directly or via the bitline BL.

For example, during the program execution operation, the voltage generator 550 may apply the program voltage VPGM to the selected wordline and may apply a program pass voltage to unselected wordlines via the address decoder 520. In addition, during the program verification operation, the voltage generator 550 may apply the program verification voltage VPV to the selected wordline and may apply a verification pass voltage to the unselected wordlines via the address decoder 520.

The page buffer circuit 530 may be connected to the memory cell array 510 via the plurality of bitlines BL. For example, the page buffer circuit 530 may include a plurality of page buffers (e.g., page buffers PB1 to PBx in FIG. 23A). The page buffer circuit 530 may store data DAT to be programmed into the memory cell array 510 or may read data DAT sensed from the memory cell array 510. In other words, the page buffer circuit 530 may operate as a write driver or a sensing amplifier according to an operation mode of the nonvolatile memory device 500.

The data I/O circuit 540 may be connected to the page buffer circuit 530 via data lines DL. The data I/O circuit 540 may provide the data DAT from the outside of the nonvolatile memory device 500 to the memory cell array 510 via the page buffer circuit 530 or may provide the data DAT from the memory cell array 510 to the outside of the nonvolatile memory device 500, based on the column address C_ADDR.

For example, the memory cell array 510 and the page buffer circuit 530 may correspond to the memory cell array 20 and the page buffer circuit 30 in FIG. 2, respectively.

Figure 21:
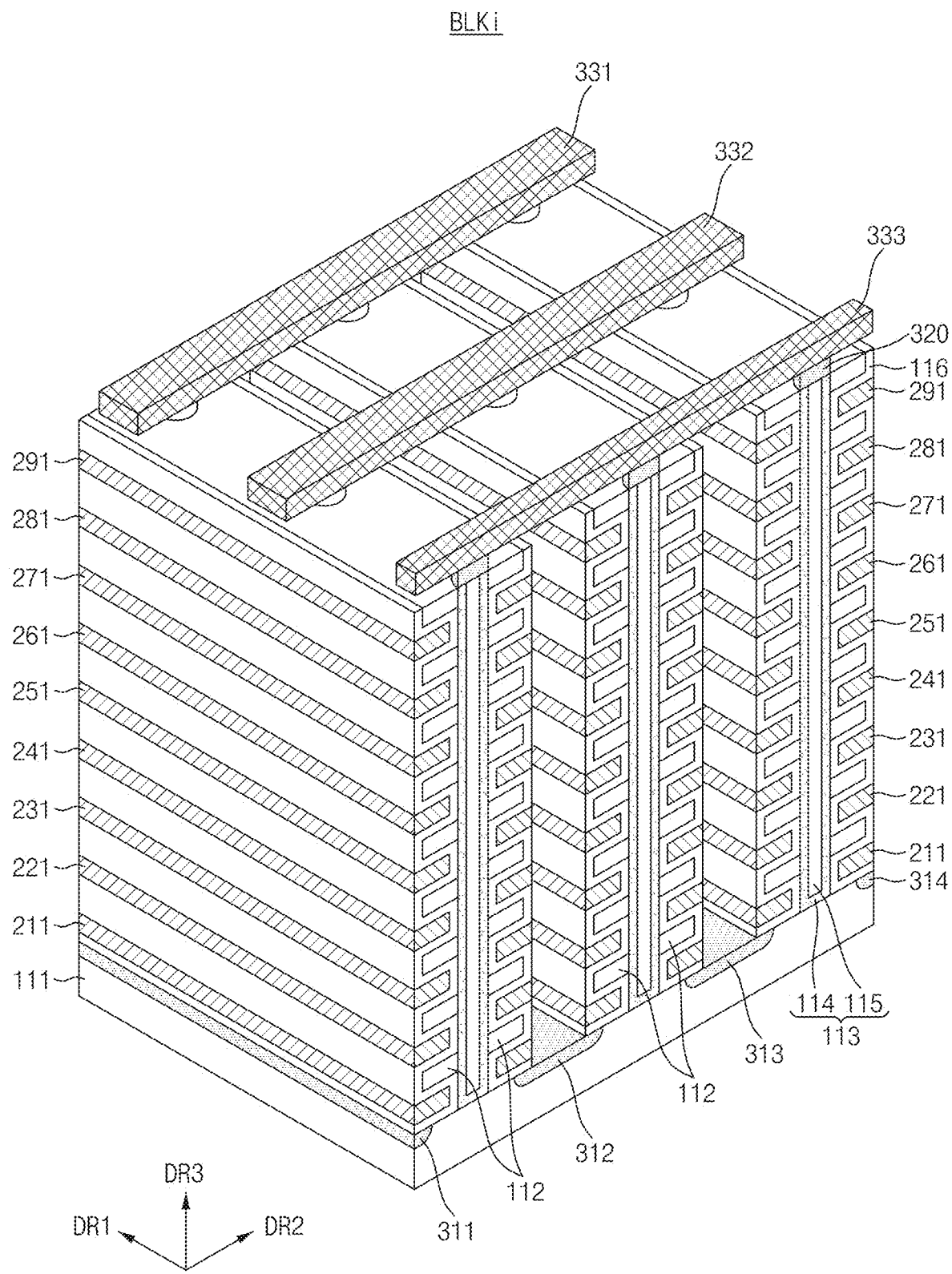
FIG. 21 is a perspective view of an example of a memory block included in a memory cell array in a nonvolatile memory device of FIG. 20.

FIG. 21 is a perspective view of an example of a memory block included in a memory cell array in a nonvolatile memory device of FIG. 20.

Referring to FIG. 21, a memory block BLKi includes a plurality of cell strings (e.g., a plurality of vertical NAND strings) which are formed on a substrate in a three-dimensional structure (or a vertical structure). The memory block BLKi includes structures extending along first, second and third directions DR1, DR2 and DR3. Two directions substantially parallel to a first surface (e.g., a top surface) of a substrate 111 and crossing each other are referred to as the first direction DR1 (e.g., a X-axis direction) and the second direction DR2 (e.g., a Y-axis direction). In addition, a direction substantially vertical to the first surface of the substrate 111 is referred to as the third direction DR3 (e.g., a Z-axis direction). For example, the first and second directions DR1 and DR2 may be substantially perpendicular to each other. In addition, the third direction DR3 may be substantially perpendicular to both the first and second directions DR1 and DR2.

The substrate 111 is provided. For example, the substrate 111 may have a well of a first type of charge carrier impurity (e.g., a first conductivity type) therein. For example, the substrate 111 may have a p-well formed by implanting a group III element such as boron (B). In particular, the substrate 111 may have a pocket p-well provided within an n-well. In some implementations, the substrate 111 has a p-type well (or a p-type pocket well). However, the conductive type of the substrate 111 is not limited to p-type.

A plurality of doping regions 311, 312, 313 and 314 arranged along the second direction DR2 are provided in/on the substrate 111. These plurality of doping regions 311 to 314 may have a second type of charge carrier impurity (e.g., a second conductivity type) different from the first type of the substrate 111. In some implementations, the first to fourth doping regions 311 to 314 may be an n-type. However, the conductive type of the first to fourth doping regions 311 to 314 is not limited to n-type.

A plurality of insulation materials 112 extending along the first direction DR1 are sequentially provided along the third direction DR3 on a region of the substrate 111 between the first and second doping regions 311 and 312. For example, the plurality of insulation materials 112 are provided along the third direction DR3, being spaced by a specific distance. For example, the insulation materials 112 may include an insulation material such as an oxide layer.

A plurality of pillars 113 penetrating the insulation materials along the third direction DR3 are sequentially disposed along the first direction DR1 on a region of the substrate 111 between the first and second doping regions 311 and 312. For example, the plurality of pillars 113 may penetrate the insulation materials 112 to contact the substrate 111.

In some implementations, each pillar 113 includes a plurality of materials. For example, a channel layer 114 of each pillar 113 may include a silicon material having a first conductivity type. For example, the channel layer 114 of each pillar 113 may include a silicon material having the same conductivity type as the substrate 111. In some implementations, the channel layer 114 of each pillar 113 includes p-type silicon. However, the channel layer 114 of each pillar 113 is not limited to the p-type silicon.

An internal material 115 of each pillar 113 includes an insulation material. For example, the internal material 115 of each pillar 113 may include an insulation material such as a silicon oxide. In an example, the internal material 115 of each pillar 113 includes an air gap. The term 'air' as discussed herein, may refer to atmospheric air, or other gases that may be present during the manufacturing process.

An insulation layer 116 is provided along the exposed surfaces of the insulation materials 112, the pillars 113, and the substrate 111, on a region between the first and second doping regions 311 and 312. For example, the insulation layer 116 provided on surfaces of the insulation material 112 may be interposed between pillars 113 and a plurality of stacked first conductive materials 211, 221, 231, 241, 251, 261, 271, 281 and 291, as illustrated. In some examples, the insulation layer 116 need not be provided between the first conductive materials 211 to 291 corresponding to ground selection lines GSL (e.g., 211) and string selection lines SSL (e.g., 291). In this example, the ground selection lines GSL are the lowermost ones of the stack of first conductive materials 211 to 291 and the string selection lines SSL are the uppermost ones of the stack of first conductive materials 211 to 291.

The plurality of first conductive materials 211 to 291 are provided on surfaces of the insulation layer 116, in a region between the first and second doping regions 311 and 312. For example, the first conductive material 211 extending along the first direction DR1 is provided between the insulation material 112 adjacent to the substrate 111 and the substrate 111. In more detail, the first conductive material 211 extending along the first direction DR1 is provided between the insulation layer 116 at the bottom of the insulation material 112 adjacent to the substrate 111 and the substrate 111.

A first conductive material extending along the first direction DR1 is provided between the insulation layer 116 at the top of the specific insulation material among the insulation materials 112 and the insulation layer 116 at the bottom of a specific insulation material among the insulation materials 112. For example, a plurality of first conductive materials 221 to 281 extending along the first direction DR1 are provided between the insulation materials 112 and it may be understood that the insulation layer 116 is provided between the insulation materials 112 and the first conductive materials 221 to 281. The first conductive materials 211 to 291 may be formed of a conductive metal, but the first conductive materials 211 to 291 may include a conductive material such as a polysilicon in other implementations.

The same structures as those on the first and second doping regions 311 and 312 may be provided in a region between the second and third doping regions 312 and 313. In the region between the second and third doping regions 312 and 313, a plurality of insulation materials 112 are provided, which extend along the first direction DR1. A plurality of pillars 113 are provided that are disposed sequentially along the first direction DR1 and penetrate the plurality of insulation materials 112 along the third direction DR3. An insulation layer 116 is provided on the exposed surfaces of the plurality of insulation materials 112 and the plurality of pillars 113, and a plurality of first conductive materials 211 to 291 extend along the first direction DR1. Similarly, the same structures as those on the first and second doping regions 311 and 312 may be provided in a region between the third and fourth doping regions 313 and 314.

A plurality of drain regions 320 are provided on the plurality of pillars 113, respectively. The drain regions 320 may include silicon materials doped with a second type of charge carrier impurity. For example, the drain regions 320 may include silicon materials doped with an n-type dopant. In some implementations, the drain regions 320 include n-type silicon materials. However, the drain regions 320 are not limited to n-type silicon materials.

On the drain regions, a plurality of second conductive materials 331, 332 and 333 are provided, which extend along the second direction DR2. The second conductive materials 331 to 333 are disposed along the first direction DR1, being spaced apart from each other by a specific distance. The second conductive materials 331 to 333 are respectively connected to the drain regions 320 in a corresponding region. The drain regions 320 and the second conductive material 333 extending along the second direction DR2 may be connected through each contact plug. Each contact plug may be, for example, a conductive plug formed of a conductive material such as a metal. The second conductive materials 331 to 333 may include metal materials. The second conductive materials 331 to 333 may include conductive materials such as a polysilicon.

Figure 22:
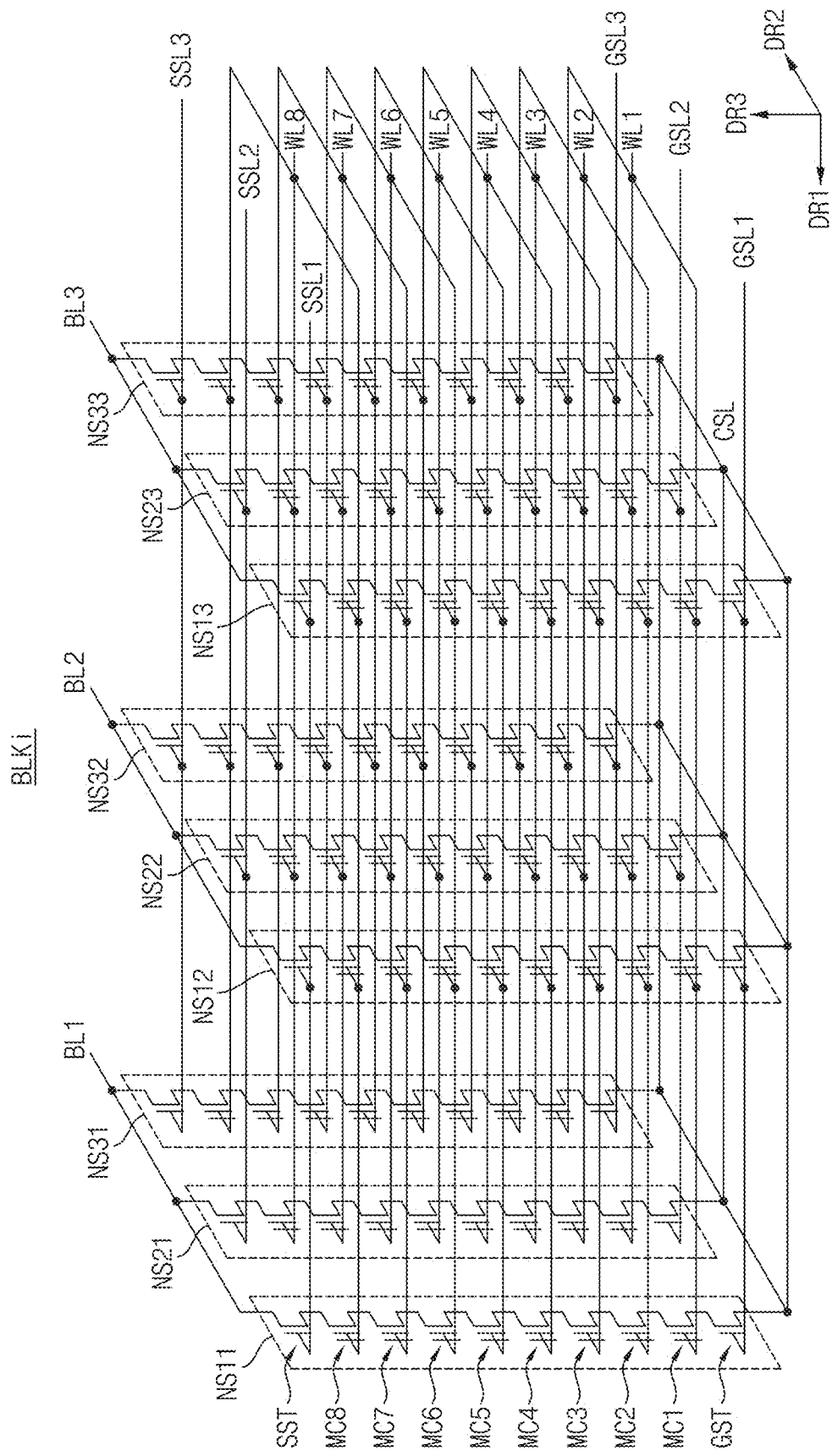
FIG. 22 is a circuit diagram illustrating an equivalent circuit of a memory block described with reference to FIG. 21.

FIG. 22 is a circuit diagram illustrating an equivalent circuit of a memory block described with reference to FIG. 21.

A memory block BLKi of FIG. 22 may be formed on a substrate in a three-dimensional structure (or a vertical structure). For example, a plurality of cell strings included in the memory block BLKi may be formed in a direction perpendicular to the substrate.

Referring to FIG. 22, the memory block BLKi includes a plurality of cell strings NS11, NS12, NS13, NS21, NS22, NS23, NS31, NS32 and NS33 connected between bitlines BL1, BL2 and BL3 and a common source line CSL. Each of the cell strings NS11 to NS33 includes a string selection transistor SST, a plurality of memory cells MC1, MC2, MC3, MC4, MC5, MC6, MC7 and MC8, and a ground selection transistor GST. For example, the bitlines BL1 to BL3 may correspond to the second conductive materials 331 to 333 in FIG. 21, and the common source line CSL may be formed by interconnecting the first to fourth doping regions 311 to 314 in FIG. 21.

Each string selection transistor SST may be connected to a corresponding string selection line (e.g., one of SSL1, SSL2 and SSL3). The plurality of memory cells MC1 to MC8 may be connected to corresponding wordlines WL1, WL2, WL3, WL4, WL5, WL6, WL7 and WL8, respectively. Each ground selection transistor GST may be connected to a corresponding ground selection line (e.g., one of GSL1, GSL2 and GSL3). Each string selection transistor SST may be connected to a corresponding bitline (e.g., one of BL1 to BL3), and each ground selection transistor GST may be connected to the common source line CSL. In the example of FIG. 22, some of the string selection transistors SST are connected to the same bitline (e.g., one of BL1 to BL3) to connect corresponding cell strings to the same bitline via appropriate selection via selection voltages applied to the appropriate sting selection lines SSL1 to SSL3 and ground selection lines GSL1 to GSL3.

The cell strings connected in common to one bitline may form one column, and the cell strings connected to one string selection line may form one row. For example, the cell strings NS11, NS21 and NS31 connected to the first bitline BL1 may correspond to a first column, and the cell strings NS11, NS12 and NS13 connected to the first string selection line SSL1 may form a first row.

Wordlines (e.g., WL1) having the same height may be commonly connected, and the ground selection lines GSL1 to GSL3 and the string selection lines SSL1 to SSL3 may be separated. Memory cells located at the same semiconductor layer share a wordline. Cell strings in the same row share a string selection line. The common source line CSL is connected in common to all of the cell strings.

A three-dimensional vertical array structure may include vertical NAND strings that are vertically oriented such that at least one memory cell is located over another memory cell. The at least one memory cell may comprise a charge trap layer. The following patent documents, which are hereby incorporated by reference in their entireties, describe suitable configurations for a memory cell array including a 3D vertical array structure, in which the three-dimensional memory array is configured as a plurality of levels, with wordlines and/or bitlines shared between levels: U.S. Pat. Nos. 7,679,133; 8,553,466; 8,654,587; 8,559,235; and US Pat. Pub. No. 2011/0233648.

Although the nonvolatile memory device according to some implementations is described based on a NAND flash memory device, the nonvolatile memory device according to some implementations may be any nonvolatile memory device, e.g., a phase-change random access memory (PRAM), a resistive random access memory (RRAM), a nano floating gate memory (NFGM), a polymer random access memory (PoRAM), a magnetic random access memory (MRAM), a ferroelectric random access memory (FRAM), a thyristor random access memory (TRAM), etc.

Figure 23A:
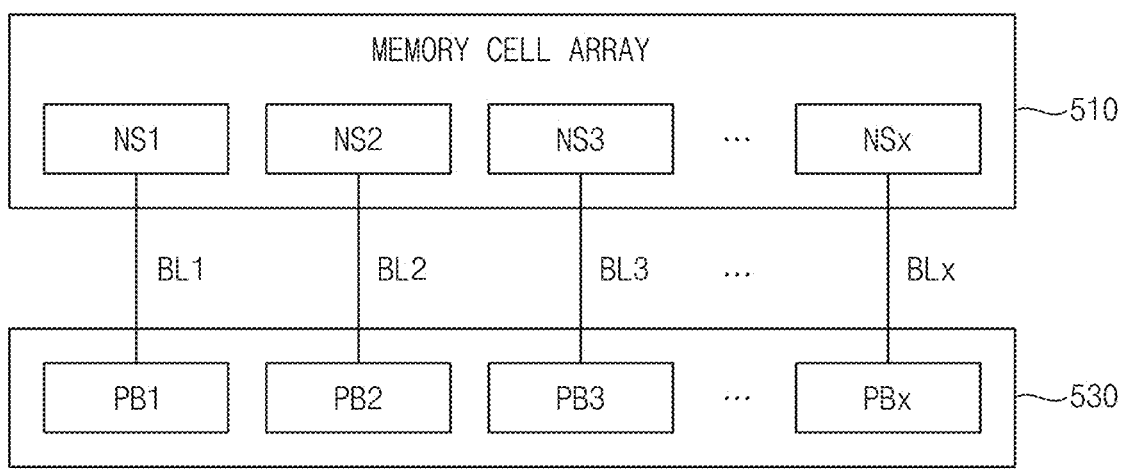
FIGS. 23A and 23B are diagrams illustrating an example of a memory cell array and an example of a page buffer circuit included in a nonvolatile memory device of FIG. 20.
Figure 23B:
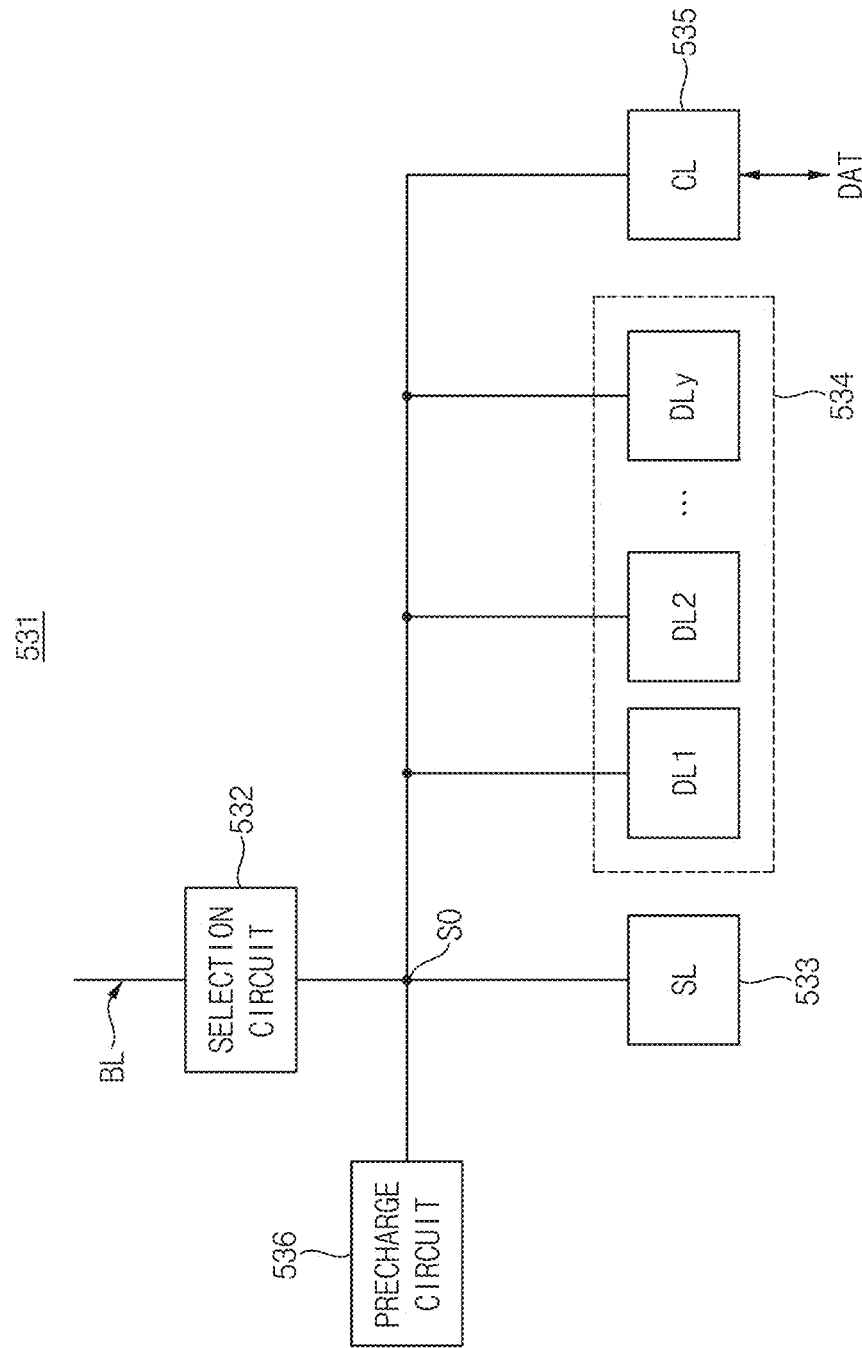

FIGS. 23A and 23B are diagrams illustrating an example of a memory cell array and an example of a page buffer circuit included in a nonvolatile memory device of FIG. 20.

Referring to FIG. 23A, the memory cell array 510 includes a plurality of cell strings NS1, NS2, NS3, . . . , NSx, and the page buffer circuit 530 includes a plurality of page buffers PB1, PB2, PB3, . . . , PBx, where x is a positive integer greater than or equal to two.

The plurality of cell strings NS1 to NSx may extend in a direction perpendicular to a substrate, and may correspond to the cell strings NS11 to NS33 in FIG. 22. The plurality of cell strings NS1 to NSx may be connected to the plurality of page buffers PB1 to PBx, respectively, through a plurality of bitlines BL1, BL2, BL3, . . . , BLx, respectively. The page buffers PB1 to PBx may control the cell strings NS1 to NSx and memory cells included therein.

Referring to FIG. 23B, a page buffer 531 includes a selection circuit 532, a sense latch (SL) 533, a plurality of data latches (DL1, DL2, . . . , DLy) 534, a cache latch (CL) 535, and a precharge circuit 536. Although not illustrated in detail, the page buffer 531 may further include a forcing latch, a switching circuit, etc. For example, the page buffer 531 may be one of the page buffers PB1 to PBx in FIG. 23A.

The selection circuit 532 may be disposed between a bitline BL and a sensing node SO, and may electrically connect the bitline BL with the sensing node SO based on a selection control signal (e.g., a bit line shut-off signal). For example, the selection circuit 532 may include at least one transistor that is turned on or off in response to the selection control signal.

During the program operation and/or the read operation, the precharge circuit 536 may precharge the corresponding bitline (or selected bitline) BL. For example, the precharge circuit 536 may supply a precharge voltage to the corresponding bitline BL.

After a sensing operation, the sense latch 533 may store data programmed in a memory cell connected to the corresponding bitline (or selected bitline) BL by sensing a voltage at the sensing node SO and by latching the sensed value.

During the program operation, the cache latch 535 may receive data (e.g., program data) DAT to be programmed bit by bit, and may transfer (or transmit) the data DAT to the plurality of data latches 534. The plurality of data latches 534 may store the data DAT. For example, the target data TDAT may be separately stored in the plurality of data latches 534 according to some implementations.

Figure 24:
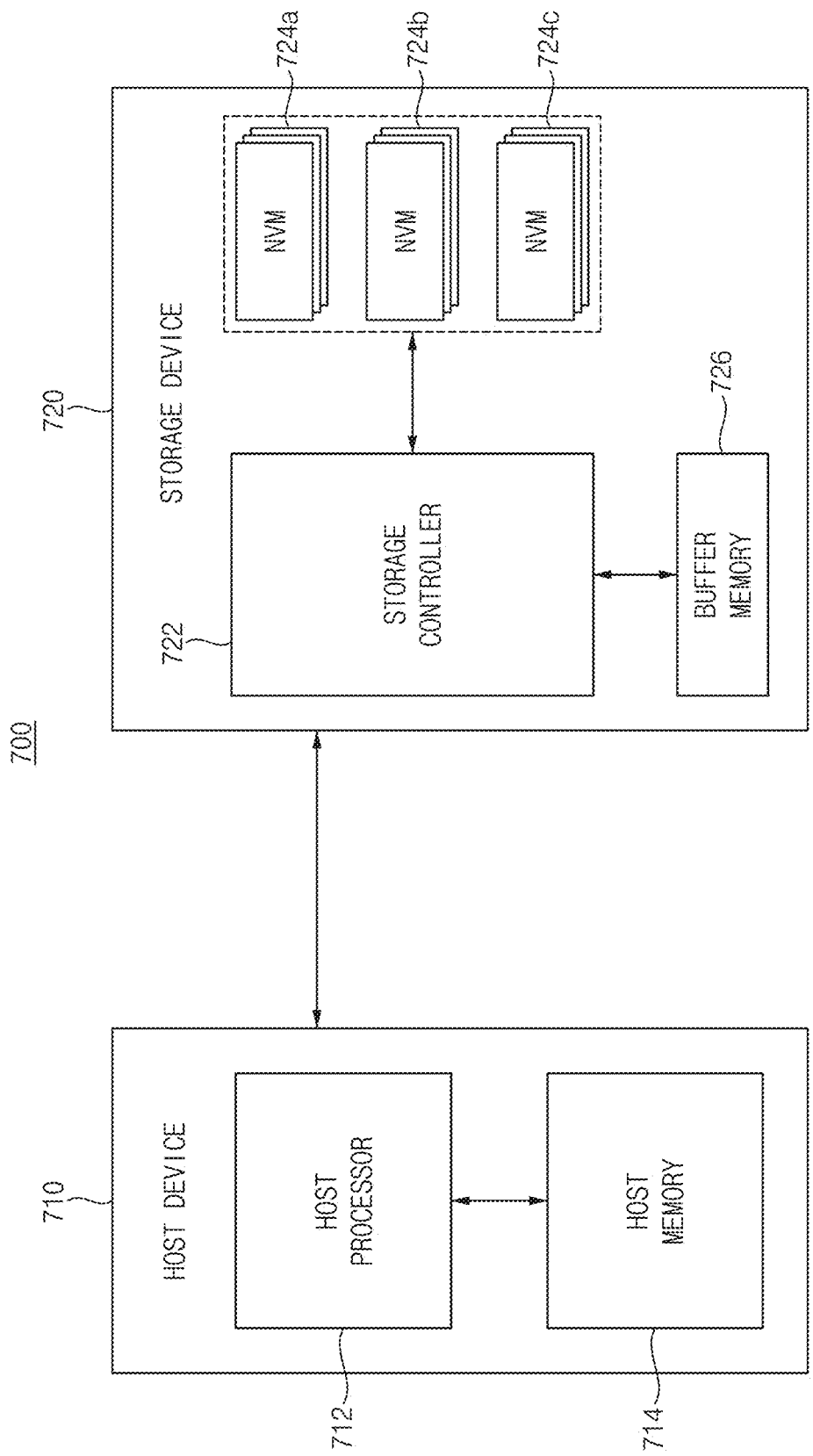
FIG. 24 is a block diagram illustrating a storage device and a storage system including the storage device according to some implementations.

FIG. 24 is a block diagram illustrating a storage device and a storage system including the storage device according to some implementations.

Referring to FIG. 24, a storage system 700 includes a host device 710 and a storage device 720.

The host device 710 controls overall operations of the storage system 700. The host device 710 includes a host processor 712 and a host memory 714.

The storage device 720 is accessed by the host device 710. The storage device 720 includes a storage controller 722, a plurality of nonvolatile memories 724a, 724b and 724c, and a buffer memory 726.

The storage controller 722 may control an operation of the storage device 720. The plurality of nonvolatile memories 724a to 724c may be controlled by the storage controller 722, and may store a plurality of data. For example, the plurality of nonvolatile memories 724a to 724c may store the sensitive data, meta data, various user data, or the like. The buffer memory 726 may store instructions and/or data that are executed and/or processed by the storage controller 722, and may temporarily store data stored in or to be stored into the plurality of nonvolatile memories 724a to 724c. For example, each of the plurality of nonvolatile memories 724a to 724c may be the nonvolatile memory device according to some implementations.

Figure 25:
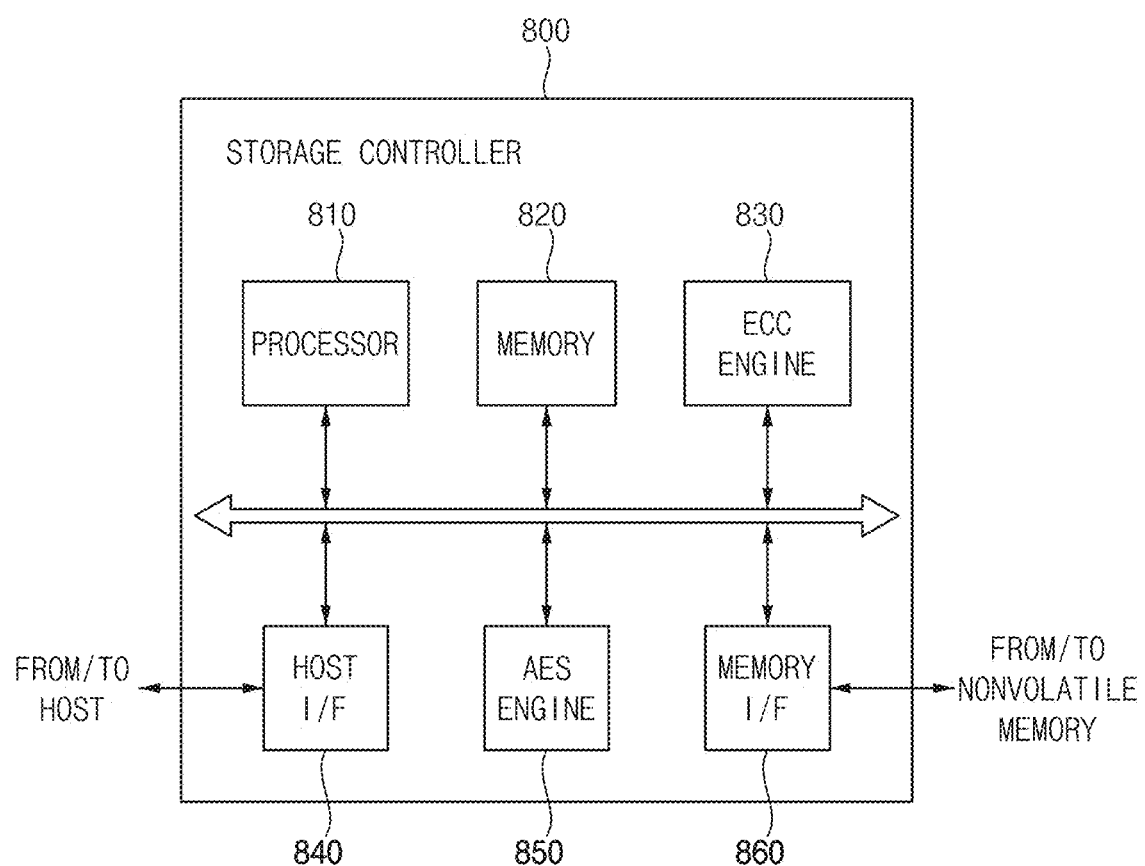
FIG. 25 is a block diagram illustrating an example of a storage controller included in a storage device of FIG. 24.

FIG. 25 is a block diagram illustrating an example of a storage controller included in a storage device of FIG. 24.

Referring to FIG. 25, a storage controller 800 includes a processor 810, a memory 820, an error correction code (ECC) engine 830, a host interface (I/F) 840, an advanced encryption standard (AES) engine 850 and a memory interface 860.

The processor 810 may control an operation of the storage controller 800 in response to a request received via the host interface 840 from a host device. The memory 820 may store instructions and data executed and processed by the processor 810. The host interface 840 may provide physical connections between the host device and the storage device. The AES engine 850 may perform at least one of an encryption operation and a decryption operation on data input to the storage controller 800 by using a symmetric-key algorithm. The memory interface 860 may exchange data with a nonvolatile memory The ECC engine 830 for error correction may perform coded modulation using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), etc., or may perform ECC encoding and ECC decoding using above-described codes or other error correction codes. For example, the ECC engine 830 may correspond to the system ECC engine 60 in FIG. 18A.

Figure 26:
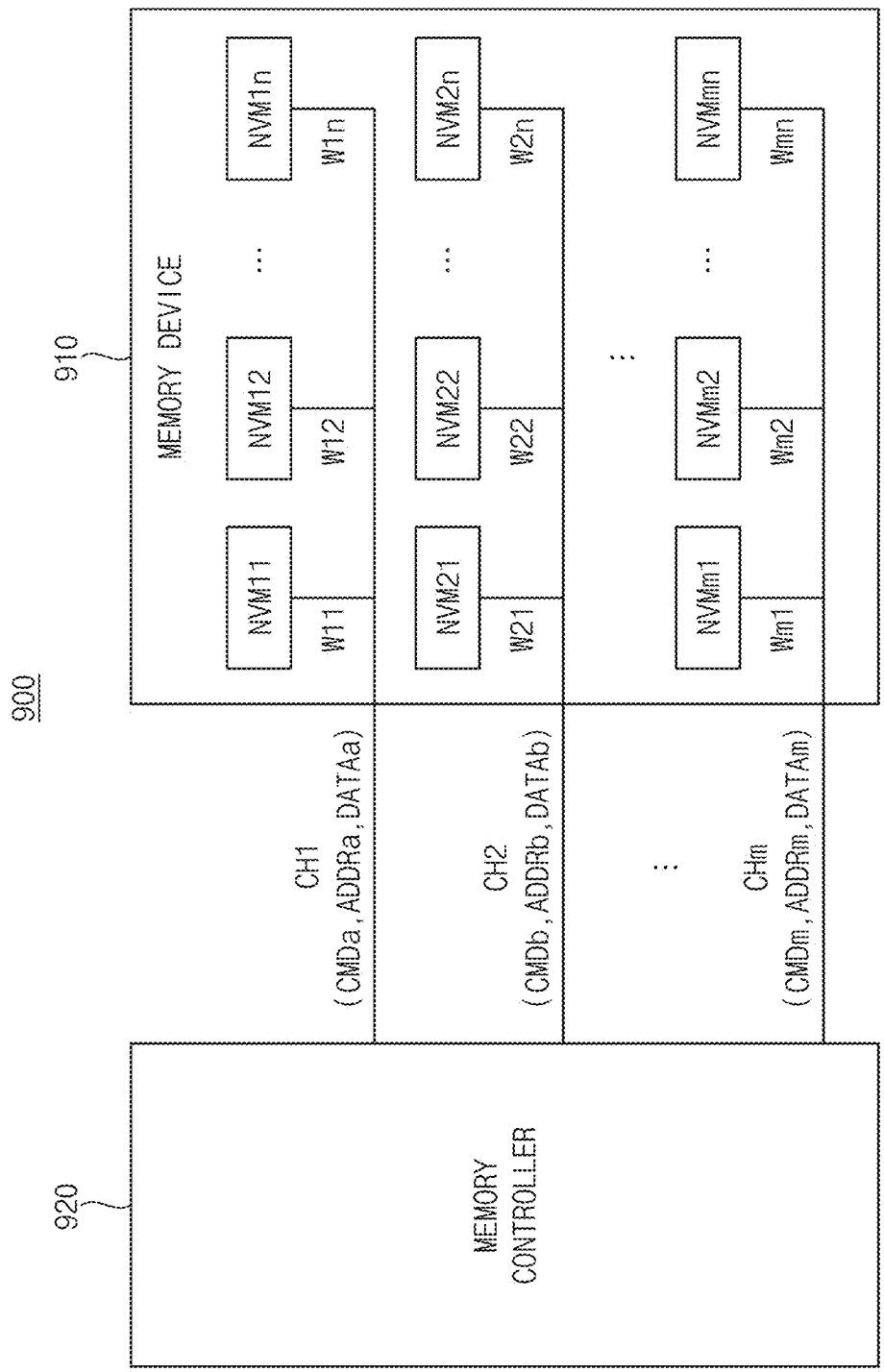
FIG. 26 is a block diagram illustrating a nonvolatile memory device and a memory system including the nonvolatile memory device according to some implementations.

FIG. 26 is a block diagram illustrating a nonvolatile memory device and a memory system including the nonvolatile memory device according to some implementations.

Referring to FIG. 26, a memory system 900 includes a memory device 910 and a memory controller 920. The memory system 900 may support a plurality of channels CH1, CH2, . . . , CHm, and the memory device 910 may be connected to the memory controller 920 through the plurality of channels CH1 to CHm. For example, the memory system 900 may correspond to the storage device 700 in FIG. 15.

The memory device 910 includes a plurality of nonvolatile memories NVM11, NVM12, . . . NVM1$n$, NVM21, NVM22, . . . , NVM2$n$, NVMm1, NVMm2, . . . , NVMmn. For example, the nonvolatile memories NVM11 to NVMmn may correspond to the nonvolatile memories 724$a$ to 724$c$ in FIG. 24. Each of the nonvolatile memories NVM11 to NVMmn may be connected to one of the plurality of channels CH1 to CHm through one of a plurality of ways W11, W12, . . . , W1$n$, W21, W22, . . . , W2$n$, Wm1, Wm2, . . . , Wmn corresponding thereto.

The memory controller 920 may control overall operations of the memory device 910, and may transmit and receive signals to and from the memory device 910 through the plurality of channels CH1 to CHm. For example, the memory controller 920 may correspond to the storage controller 722 in FIG. 24. For example, the memory controller 920 may transmit commands CMDa, CMDb, . . . , CMDm, addresses ADDRa, ADDRb, . . . , ADDRm and data DATAa, DATAb, . . . , DATAm to the memory device 910 through the channels CH1 to CHm or may receive the data DATAa to DATAm from the memory device 910.

The memory controller 920 may select one of the nonvolatile memories NVM11 to NVMmn, which is connected to each of the channels CH1 to CHm, by using a corresponding one of the channels CH1 to CHm, and may transmit and receive signals to and from the selected nonvolatile memory. The memory controller 920 may transmit and receive signals to and from the memory device 910 in parallel through different channels.

In some implementations, I/O buses of the nonvolatile memories NVM11 to NVMmn may be connected to the channels CH1 to CHm, and the operation of FIG. 16 may be performed for each channel. For example, when the copyback operation is to be performed on the nonvolatile memories NVM11 and NVM21, the nonvolatile memory NVM11 may perform the first copyback operation in S1200 if an operating state of the channel CH1 is busy, and the nonvolatile memory NVM21 may perform the second copyback operation in S1300 if an operating state of the channel CH2 is not busy.

The some implementations may be applied to various electronic devices and systems that include the nonvolatile memory devices and the storage devices. For example, some implementations may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, an automotive, etc.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

The foregoing is illustrative of some implementations and is not to be construed as limiting thereof. Although some implementations have been described, those skilled in the art will readily appreciate that many modifications are possible in the implementations without materially departing from the novel teachings and advantages of the implementations. Accordingly, all such modifications are intended to be included within the scope of the implementations as defined in the claims. Therefore, it is to be understood that the foregoing is illustrative of various implementations and is not to be construed as limited to the specific implementations disclosed, and that modifications to the disclosed implementations, as well as other implementations, are intended to be included within the scope of the appended claims.

What is claimed is:

1. A method of performing a copyback operation in a nonvolatile memory device, the method comprising:
receiving a copyback command for target data, wherein the target data are programmed in a source area based on a plurality of first voltage levels;
performing a hard data read operation on the target data based on the copyback command;
performing a soft data read operation on the target data based on the copyback command, the soft data read operation being different from the hard data read operation;
classifying, based on results of the hard data read operation and the soft data read operation, a plurality of memory cells in the source area into one or more normal memory cells and one or more weak memory cells;
performing, based on a plurality of second voltage levels, a first copyback program operation in which first data among the target data are stored in a destination area, the first data corresponding to the one or more normal memory cells; and
performing, based on a plurality of third voltage levels different from the plurality of second voltage levels, a second copyback program operation in which second data among the target data are stored in the destination area, the second data corresponding to the one or more weak memory cells.

2. The method of claim 1,
wherein, while the hard data read operation and the soft data read operation are performing, the target data are internally stored in the nonvolatile memory device without being output to an external device, and
wherein, while the first copyback program operation and the second copyback program operation are performing, the first data and the second data are internally provided to the nonvolatile memory device without being received from the external device.

3. The method of claim 1,
wherein, before the first copyback program operation and the second copyback program operation are performed, the plurality of normal memory cells and the plurality of weak memory cells have a first threshold voltage distribution, wherein, after the first copyback program operation and the second copyback program operation are performed, a plurality of first memory cells in which the first data are stored in the destination area have a second threshold voltage distribution, and a plurality of second memory cells in which the second data are stored in the destination area have the second threshold voltage distribution, and wherein the first threshold voltage distribution and the second threshold voltage distribution are the same.

4. The method of claim 1, wherein, after an initial program operation in which the target data are stored in the source area based on the first voltage levels is performed, each memory cell of the plurality of memory cells in the source area is programmed such that each memory cell of the plurality of memory cells in the source area has either a first state or second state, the second state being different from the first state.

5. The method of claim 4,
wherein the plurality of first voltage levels include a first initial target level and a second initial target level, and
wherein the first state is formed based on the first initial target level, and the second state is formed based on the second initial target level.

6. The method of claim 4, wherein performing the hard data read operation includes:
determining, based on a first read level, that each memory cell of the plurality of memory cells in the source area corresponds to a first data value or a second data value, the first data value corresponding to the first state, and the second data value corresponding to the second state.

7. The method of claim 6, wherein performing the soft data read operation includes:
determining, based on a second read level and a third read level, that each memory cell of the plurality of memory cells in the source area corresponds to the first data value or the second data value, the second read level and the third read level both being different from the first read level.

8. The method of claim 7, wherein classifying the plurality of memory cells in the source area into the one or more normal memory cells and the one or more weak memory cells includes:
based on a result of the soft data read operation on a first memory cell among the plurality of memory cells in the source area corresponding to the first data value, determining that the first memory cell is a normal memory cell of the one or more normal memory cells; and
based on the result of the soft data read operation on the first memory cell corresponding to the second data value, determining that the first memory cell is a weak memory cell of the one or more weak memory cells.

9. The method of claim 4, wherein performing the first copyback program operation includes:
programming first normal data among the first data into one or more first normal memory cells among a plurality of memory cells in the destination area, the first normal data corresponding to the first state; and
programming second normal data among the first data into one or more second normal memory cells among the plurality of memory cells in the destination area, the second normal data corresponding to the second state.

10. The method of claim 9,
wherein the plurality of second voltage levels include a first normal target level and a second normal target level, and wherein the first state is formed in the one or more first normal memory cells based on the first normal target level, and the second state is formed in the one or more second normal memory cells based on the second normal target level.

11. The method of claim 9, wherein performing the second copyback program operation includes:
programming first weak data among the second data into one or more first weak memory cells among the plurality of memory cells in the destination area, the first weak data corresponding to the first state; and
programming second weak data among the second data into one or more second weak memory cells among the plurality of memory cells in the destination area, the second weak data corresponding to the second state.

12. The method of claim 11,
wherein the third voltage levels include a first weak target level and a second weak target level, and
wherein a portion of the first state is formed in the first weak memory cells based on the first weak target level, and a portion of the second state is formed in the second weak memory cells based on the second weak target level.

13. The method of claim 4,
wherein the nonvolatile memory device includes the plurality of memory cells,
wherein each of the plurality of memory cells is configured to store two or more bits of data, and each of the plurality of memory cells is programmed such that each of the plurality of memory cells has a respective one of a plurality of program states, the plurality of program states being different from each other, and
wherein the first state and the second state are included in the plurality of program states.

14. The method of claim 4, wherein the initial program operation, the first copyback program operation, and the second copyback program operation are performed based on an incremental step pulse program (ISPP) scheme.

15. The method of claim 1, further comprising:
checking an operating state of an input/output (I/O) bus of the nonvolatile memory device.

16. The method of claim 15, further comprising:
based on the operating state of the I/O bus being busy, performing a first copyback operation without an error correction code (ECC) operation, the first copyback operation including the hard data read operation, the soft data read operation, the first copyback program operation, and the second copyback program operation; and
based on the operating state of the I/O bus being not busy, performing a second copyback operation with the ECC operation.

17. The method of claim 16, wherein, while the second copyback operation is performing, the target data is read from the source area and output to a memory controller located outside the nonvolatile memory device, the ECC operation is performed by the memory controller, and the nonvolatile memory device receives the target data corrected by the ECC operation and programs the target data in the destination area.

18. A nonvolatile memory device comprising:
a memory cell array including
a plurality of memory cells,
a source area in which target data are programmed based on a plurality of first voltage levels, and
a destination area in which the target data are to be copied;

a page buffer circuit configured to temporarily store the target data; and
a control circuit configured to
control an operation of the memory cell array,
receive a copyback command for the target data,
perform a hard data read operation on the target data based on the copyback command,
perform a soft data read operation on the target data based on the copyback command, the soft data read operation being different from the hard data read operation,
classify, based on results of the hard data read operation and the soft data read operation, a plurality of memory cells in the source area into one or more normal memory cells and one or more weak memory cells,
perform, based on a plurality of second voltage levels, a first copyback program operation in which first data among the target data are stored in a destination area, the first data corresponding to the one or more normal memory cells; and
perform, based on a plurality of third voltage levels different from the plurality of second voltage levels, a second copyback program operation in which second data among the target data are stored in the destination area, the second data corresponding to the one or more weak memory cells.

19. A storage device comprising:
a plurality of nonvolatile memory devices; and
a storage controller configured to control one or more operations of the plurality of nonvolatile memory devices,
wherein each of the plurality of nonvolatile memory devices includes:
a memory cell array including
a plurality of memory cells,
a source area in which target data are programmed based on first voltage levels, and
a destination area in which the target data are to be copied,
a page buffer circuit configured to temporarily store the target data, and
a control circuit configured to
control an operation of the memory cell array,
receive a copyback command for the target data from the storage controller,
perform a hard data read operation on the target data based on the copyback command,
perform a soft data read operation on the target data based on the copyback command, the soft data read operation being different from the hard data read operation,
classify, based on results of the hard data read operation and the soft data read operation, a plurality of memory cells in the source area into one or more normal memory cells and one or more weak memory cells,
perform, based on a plurality of second voltage levels, a first copyback program operation in which first data among the target data are stored in a destination area, the first data corresponding to the one or more normal memory cells; and
perform, based on a plurality of third voltage levels different from the plurality of second voltage levels, a second copyback program operation in which second data among the target data are stored in the destination area, the second data corresponding to the one or more weak memory cells.

20. The storage device of claim 19,
wherein the plurality of nonvolatile memory devices include
a first nonvolatile memory device connected to the storage controller through a first channel; and
a second nonvolatile memory device connected to the storage controller through a second channel different from the first channel,
wherein, when an operating state of the first channel is busy, a first copyback operation is performed on the first nonvolatile memory device without an error correction code (ECC) operation, the first copyback operation comprising the hard data read operation, the soft data read operation, the first copyback program operation, and the second copyback program operation on first target data, and
wherein, when an operating state of the second channel is not busy, a second copyback operation is performed on the second nonvolatile memory device, the second copyback operation comprising outputting second target data to the storage controller, performing the ECC operation on the second target data by the storage controller, receiving the second target data corrected by the ECC operation from the storage controller, and programming the second target data into the second nonvolatile memory device.

* * * * *